United States Patent
Doi et al.

(10) Patent No.: US 9,316,338 B2
(45) Date of Patent: Apr. 19, 2016

(54) FRONT AND REAR CONDENSATE DRAINING HOSES FOR WORK VEHICLE

(71) Applicant: ISEKI & CO., LTD., Matsuyama-shi (JP)

(72) Inventors: Itsuki Doi, Ehime-ken (JP); Takeshi Hagiyama, Ehime-ken (JP); Koji Ochi, Ehime-ken (JP); Takayuki Kajihara, Ehime-ken (JP)

(73) Assignee: ISEKI & CO., LTD., Matsuyama-shi (JP)

( * ) Notice: Subject to any disclaimer, the term of this patent is extended or adjusted under 35 U.S.C. 154(b) by 110 days.

(21) Appl. No.: 13/688,824

(22) Filed: Nov. 29, 2012

(65) Prior Publication Data

US 2013/0139921 A1   Jun. 6, 2013

(30) Foreign Application Priority Data

Nov. 29, 2011   (JP) .................................. 2011-260703

(51) Int. Cl.
  *F16L 55/09*   (2006.01)
  *B60H 1/00*   (2006.01)
  *B60H 1/32*   (2006.01)

(52) U.S. Cl.
  CPC ............ *F16L 55/09* (2013.01); *B60H 1/00357* (2013.01); *B60H 1/00378* (2013.01); *B60H 1/00535* (2013.01); *B60H 1/3233* (2013.01); *Y10T 137/6855* (2015.04)

(58) Field of Classification Search
  CPC .......... B60H 1/00378; B60H 1/00357; B60H 1/00535; B60H 1/3233; F16L 55/09

USPC ...................... 62/272, 285, 290, 245; 165/71; 137/899, 348, 350
See application file for complete search history.

(56) References Cited

U.S. PATENT DOCUMENTS

| 5,826,440 | A | 10/1998 | Okada et al. |
| 2009/0266099 | A1 | 10/2009 | Bruss et al. |
| 2010/0126198 | A1 | 5/2010 | Holguin |
| 2010/0269530 | A1* | 10/2010 | Ichikawa ........................ 62/244 |

FOREIGN PATENT DOCUMENTS

| EP | 0 810 110 A2 | 12/1997 |
| EP | 0 810 110 A3 | 12/1997 |
| EP | 2 112 010 A1 | 10/2009 |
| EP | 2 189 312 A1 | 5/2010 |
| JP | 2-141 326 A | 5/1990 |

(Continued)

OTHER PUBLICATIONS

The Extended European Search Report issued Feb. 28, 2013, in Application No. / Patent No. 12194521.6-1756.

(Continued)

*Primary Examiner* — Jonathan Bradford
*Assistant Examiner* — Orlando Aviles Bosques
(74) *Attorney, Agent, or Firm* — Oblon, McClelland, Maier & Neustadt, L.L.P.

(57) ABSTRACT

A working vehicle includes: a cabin; an air conditioning unit disposed at a rear upper portion of the cabin; and drain hoses connected to a drain portion of the air conditioning unit, water drained from the drain portion flowing through the drain hoses, wherein the drain hoses are respectively disposed at both left and right sides of the air conditioning unit in front and rear direction, and both front and rear portions of the drain hoses are provided with drain hose outlets from which the water flowing through the drain hoses is drained.

3 Claims, 17 Drawing Sheets

(56) References Cited

FOREIGN PATENT DOCUMENTS

| | | |
|---|---|---|
| JP | 2007-308028 | 11/2007 |
| JP | 2007-308030 | 11/2007 |
| JP | 2007-308031 A | 11/2007 |

OTHER PUBLICATIONS

Japanese Office Action issued Oct. 21, 2014 in Patent Application No. 2011-260703 (with English Translation).

* cited by examiner

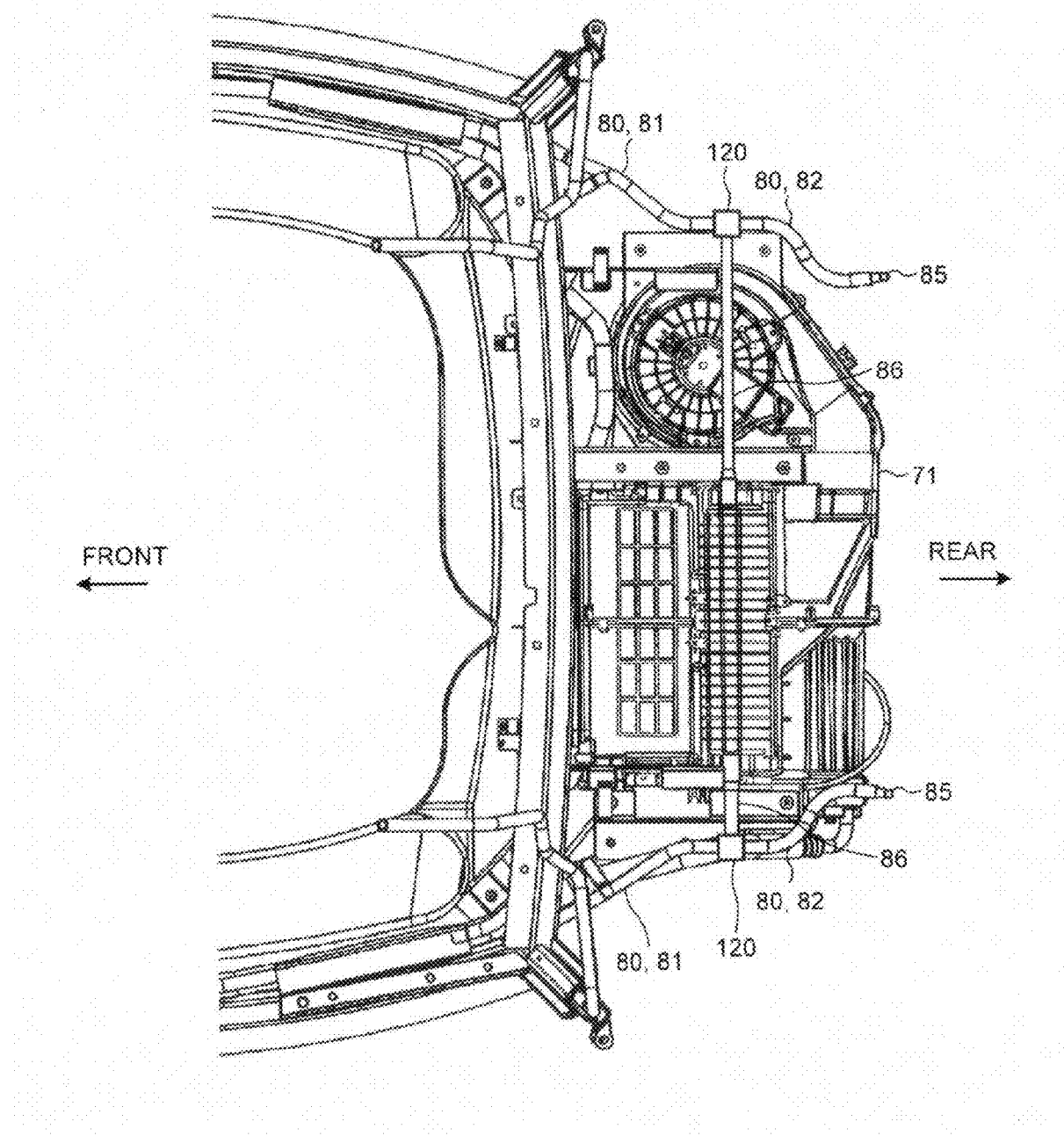

FRONT AND REAR CONDENSATE DRAINING HOSES FOR WORK VEHICLE

CROSS-REFERENCE TO RELATED APPLICATIONS

The present application claims priority to and incorporates by reference the entire contents of Japanese Patent Application No. 2011-260703 filed in Japan on Nov. 29, 2011.

BACKGROUND OF THE INVENTION

1. Field of the Invention

The present invention relates to a working vehicle.

2. Description of the Related Art

Among working vehicles such as agricultural tractors which conduct a work in an agricultural field, there is known an agricultural working vehicle equipped with an air conditioning unit for a cabin. For example, in an air conditioning structure of a working vehicle disclosed in Japanese Laid-open Patent Publication No. 2007-308030, an air conditioning unit is disposed at a rear portion of a roof of a cabin, and a drain hose connected to a drain outlet of the air conditioning unit is extracted to the outside of the vehicle from the rear portion of the roof. Accordingly, it is possible to prevent a driver's front viewing angle from being restricted by the air conditioning unit.

However, when the drain hose is extracted from the rear portion of the roof, the drain hose is wound downward from the roof. Since there is a case in which the working vehicle may run on a slope or the like, the water inside the drain hose may not easily flow depending on the posture of the working vehicle.

The invention is made in view of the above-described circumstances, and it is an object of the invention to provide a working vehicle capable of smoothly performing a drainage operation.

SUMMARY OF THE INVENTION

It is an object of the present invention to at least partially solve the problems in the conventional technology. A working vehicle comprises: a cabin; an air conditioning unit disposed at a rear upper portion of the cabin; and drain hoses connected to a drain portion of the air conditioning unit, water drained from the drain portion flowing through the drain hoses, wherein the drain hoses are respectively disposed at both left and right sides of the air conditioning unit in front and rear direction, and both front and rear portions of the drain hoses are provided with drain hose outlets from which the water flowing through the drain hoses is drained.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21 is a diagram illustrating a modified example of the tractor according to the embodiment and illustrating a case where a pump is provided.

DETAILED DESCRIPTION OF THE PREFERRED EMBODIMENTS

Figure 1:
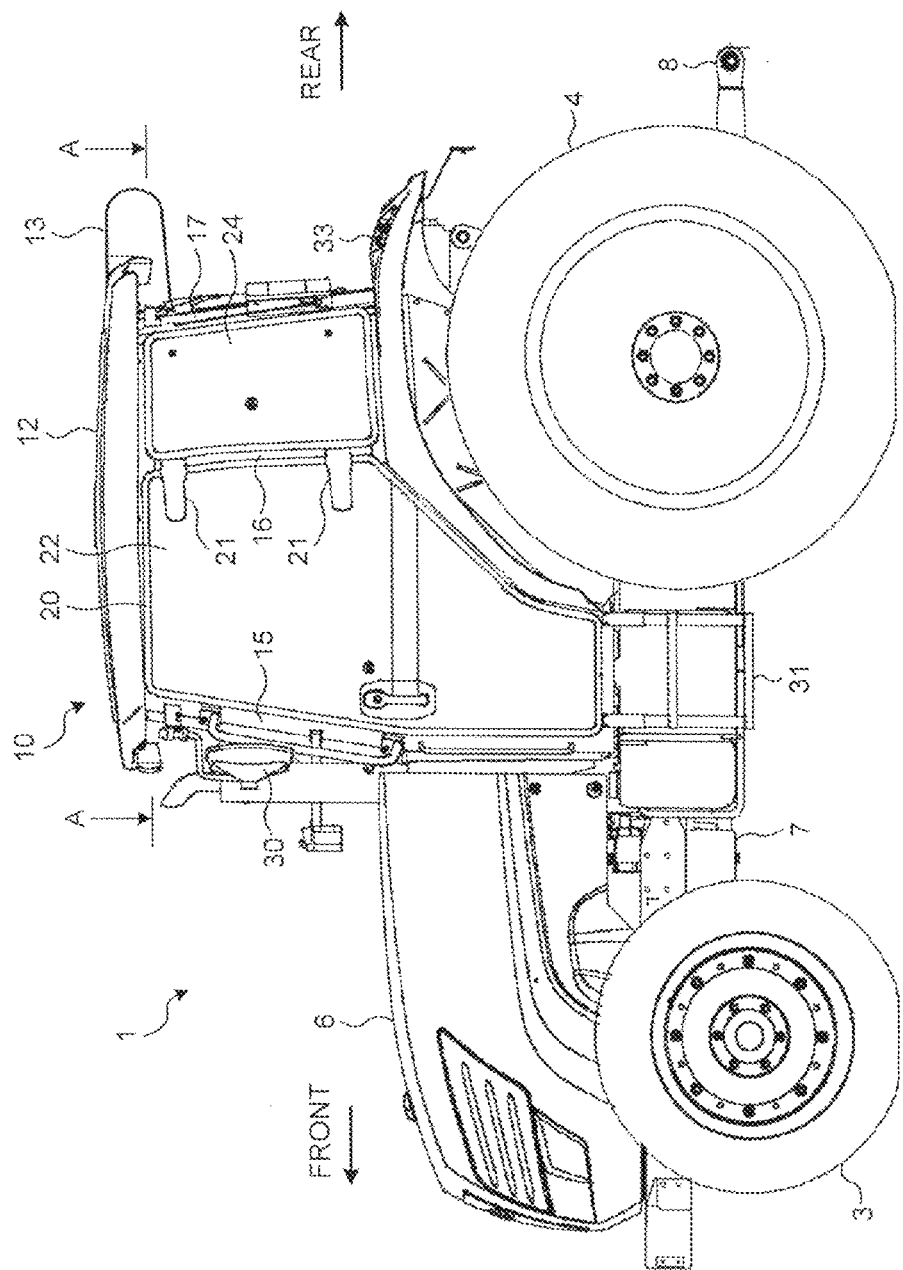
FIG. 1 is a schematic diagram of a tractor according to an embodiment.

Hereinafter, an embodiment of a working vehicle according to the invention will be described in detail by referring to the drawings. Furthermore, the invention is not limited to the embodiment. Further, the constituents in the embodiment below include a constituent that may be easily replaced by the person skilled in the art or a constituent that has substantially the same configuration.

Embodiment

FIG. 1 is a schematic diagram of a tractor according to the embodiment. Furthermore, in the description below, the front and rear direction, the left and right direction, and the up and down direction of a tractor 1 according to the embodiment equipped with an air conditioner 70 (see FIG. 12) in a normal use mode are respectively described as the front and rear direction, the left and right direction, and the up and down direction of the respective portions. The tractor 1 according to the embodiment equipped with the air conditioner 70 and corresponding to the working vehicle conducting a work in an agricultural field includes front wheels 3 which are provided as steering wheels and rear wheels 4 which are provided as driving wheels. Among these, rotative power generated by an engine (not illustrated) mounted inside a hood 6 of a front portion of a body may be transmitted to the rear wheels 4 while the speed is appropriately decreased by a transmission 7, and the rear wheels 4 generate drive power by the rotative power. Further, the transmission 7 may also transmit the rotative power generated by the engine to the front wheels 3 if necessary. In this case, the drive power is generated by four wheels of the front wheels 3 and the rear wheels 4. That is, the transmission 7 may select a two-wheel drive mode or a four-wheel drive mode.

Further, a fender 33 is provided at a position extending forward from the upper side of each rear wheel 4 so as to cover the rear wheel 4 and to prevent the scattering of dirt wound up by the rear wheel 4. In addition, a connector 8 to which a working machine such as a rotary (not illustrated) is attachable is disposed at the rear portion of the body of the tractor 1.

Figure 2:
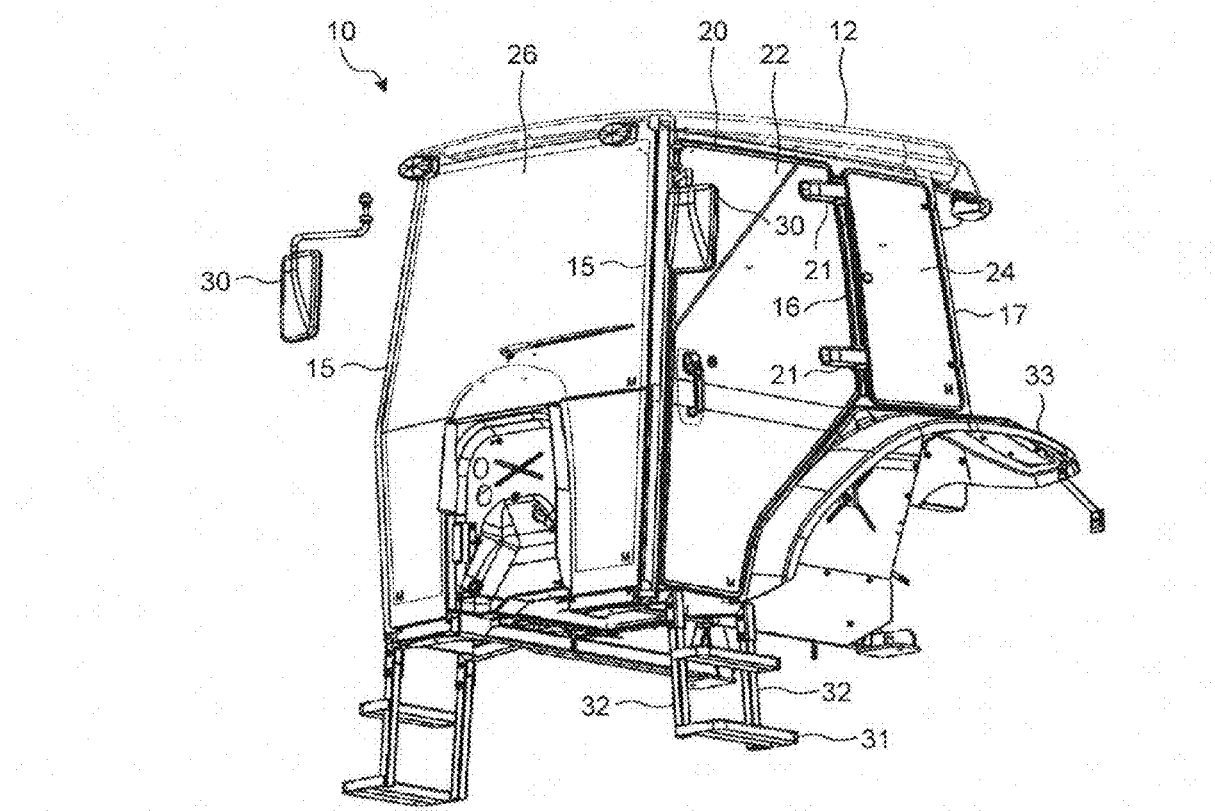
FIG. 2 is a perspective view of a cabin illustrated in FIG. 1.

FIG. 2 is a perspective view of the cabin illustrated in FIG. 1. The tractor 1 includes a cabin 10 where a driver enters when operating the tractor 1. The cabin 10 includes a roof 12 which is formed at the upper portion thereof and further includes a plurality of pillars which are support posts constituting the cabin 10 and formed in the up and down direction of the tractor 1. That is, the cabin 10 includes front pillars 15, center pillars 16, and rear pillars 17 as a plurality of pillars. Each of these pillars is disposed at each of both sides of the tractor 1 in the left and right direction.

Among these, the front pillars 15 are formed downward from the vicinity of the front end of the roof 12 in the front and rear direction of the tractor 1, and the rear pillars 17 are formed downward from the vicinity of the rear end of the roof 12. Further, each of the center pillars 16 is disposed at a position between the front pillar 15 and the rear pillar 17 in the front and rear direction, and is formed downward from the roof 12. The cabin 10 is formed so that the driver may see the outside from the inside of the cabin in a manner such that transparent glass or the like is attached to such pillars and forms a blocked space therein.

Specifically, a front window 26 is attached between the left and right front pillars 15, and a rear window 27 (see FIG. 13) is attached between the left and right rear pillars 17. Further, a rear side window 24 is attached between the center pillar 16 and the rear pillar 17. Further, an opening/closing door 20 is disposed between the front pillar 15 and the center pillar 16.

The opening/closing door 20 is connected to the center pillar 16 by a hinge 21. Accordingly, the opening/closing door 20 is disposed so as to be rotatable about the vicinity of the center pillar 16, and may close or open a space between the front pillar 15 and the center pillar 16 by the rotation thereof. A side window 22 is provided in the opening/closing door 20, and the driver may also see the outside of the opening/closing door 20 from the inside thereof through the side window 22. Further, a step 31 on which the driver steps when entering or exiting the cabin 10 is disposed below the opening/closing door 20, and a side mirror 30 which is used for the driver to see the rear side of the tractor 1 is attached to the front pillar 15 which is positioned at the front side of the opening/closing door 20.

Further, the tractor 1 is provided with an air conditioner 70 which adjusts the temperature inside the cabin 10, and the rear end of the roof 12 is provided with an air conditioner installation portion 13 which installs therein an air conditioning unit 71 (see FIG. 3) constituting a part of the air conditioner 70. The air conditioner installation portion 13 is provided so as to protrude toward the rear side of the cabin 10 in the roof 12 which is positioned above the cabin 10. For this reason, the air conditioning unit 71 is disposed at the rear upper portion of the cabin 10.

Figure 3:
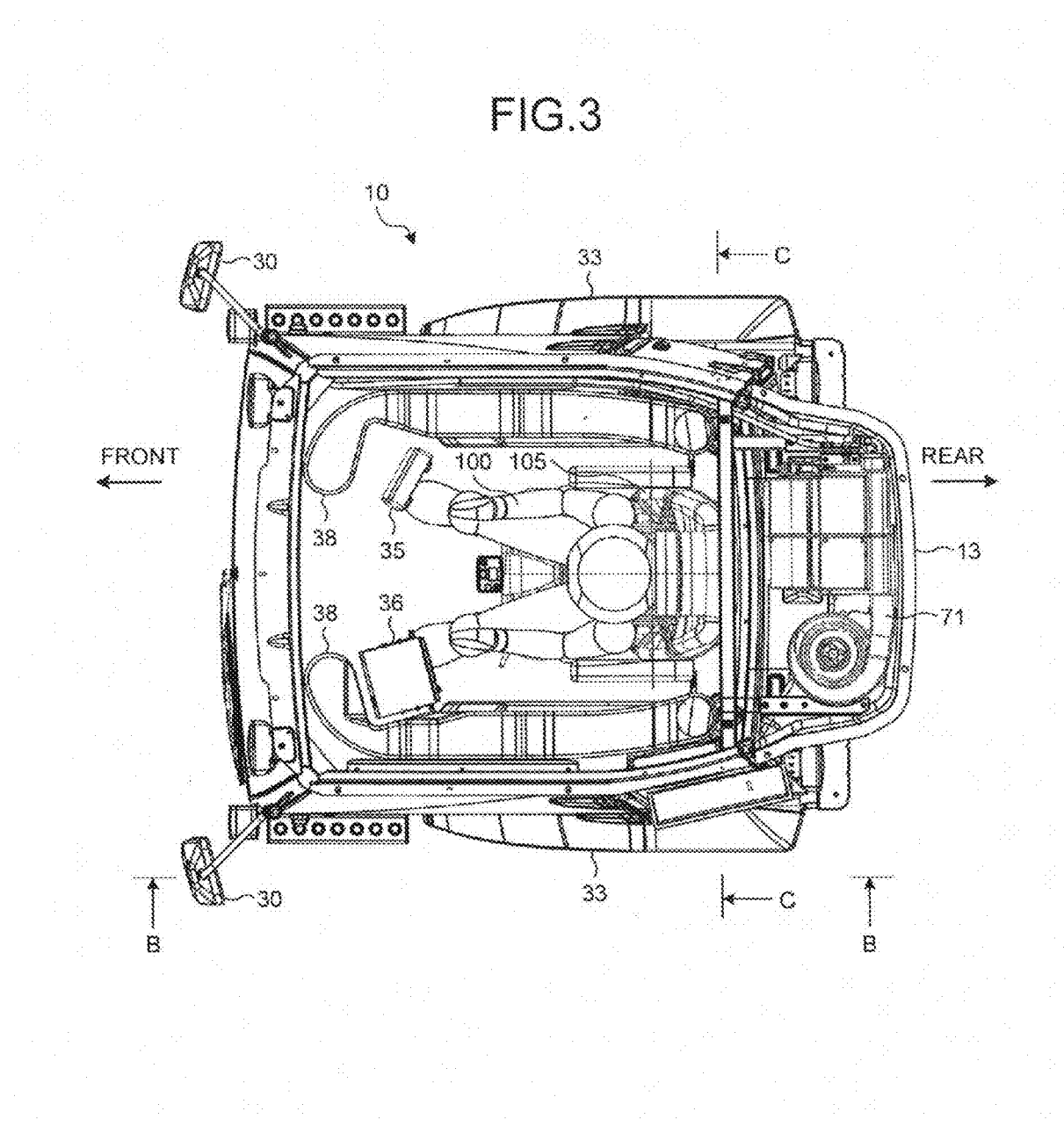
FIG. 3 is a cross-sectional view taken along line A-A of FIG. 1.
Figure 4:
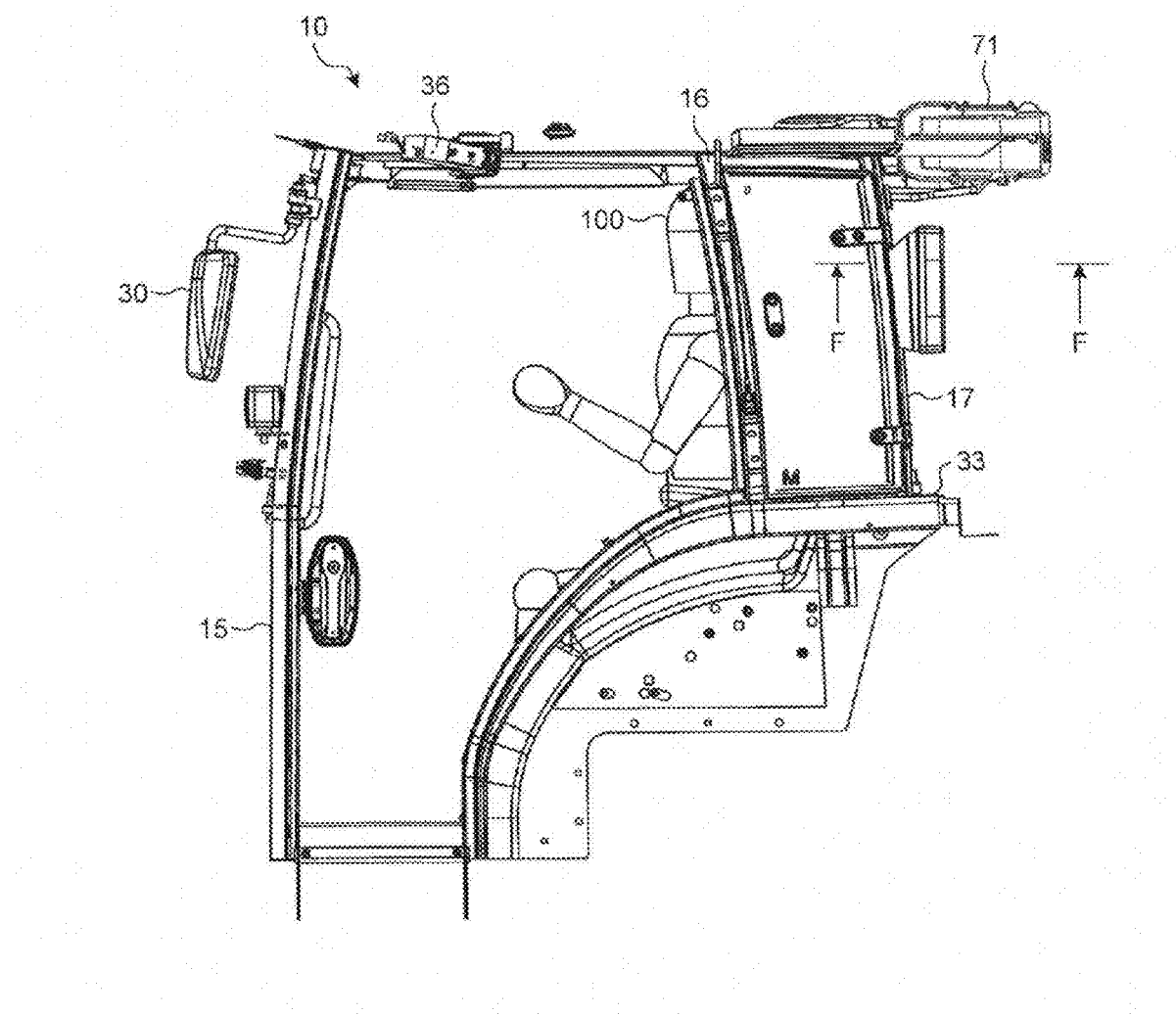
FIG. 4 is an arrow view taken along line B-B of FIG. 3.
Figure 5:
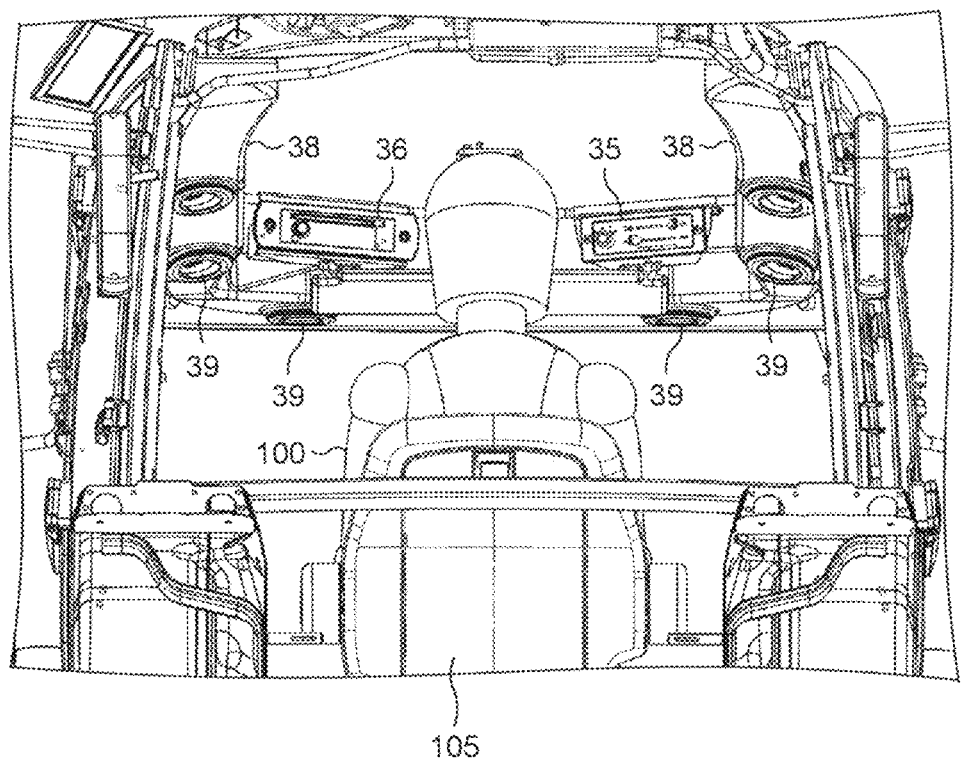
FIG. 5 is a cross-sectional view taken along line C-C of FIG. 3.

FIG. 3 is a cross-sectional view taken along line A-A of FIG. 1. FIG. 4 is an arrow view taken along line B-B of FIG. 3. FIG. 5 is a cross-sectional view taken along line C-C of FIG. 3. An air conditioning duct 38 which is disposed forward from the air conditioning unit 71 is connected to the air conditioning unit 71 which protrudes toward the upper side of the cabin 10 and the rear side of the cabin 10. That is, the air conditioning duct 38 extends in a direction from the air conditioning unit 71 toward the inside of the cabin 10. The air conditioning duct 38 is disposed at two positions near both ends inside the cabin 10 in the left and right direction along the roof 12 so that the duct is disposed forward from the air conditioning unit 71. A plurality of outlets 39 through which air flowing inside the air conditioning duct 38 blows into the cabin 10 are provided at the lower surface of the air conditioning duct 38.

Further, an air conditioner operating unit 35 which is used to operate the air conditioning unit 71 is disposed inside the cabin 10 so as to be positioned at the front side of a driver seat 105 on which a driver 100 of the tractor 1 sits. The air conditioner operating unit 35 is disposed at a position near the roof 12 at the front side of the driver seat 105 inside the cabin 10. In addition, comfortable equipment such as an audio unit 36 is provided inside the cabin 10 so that the driver 100 enjoys the equipment during the operation of the working vehicle.

Figure 6:
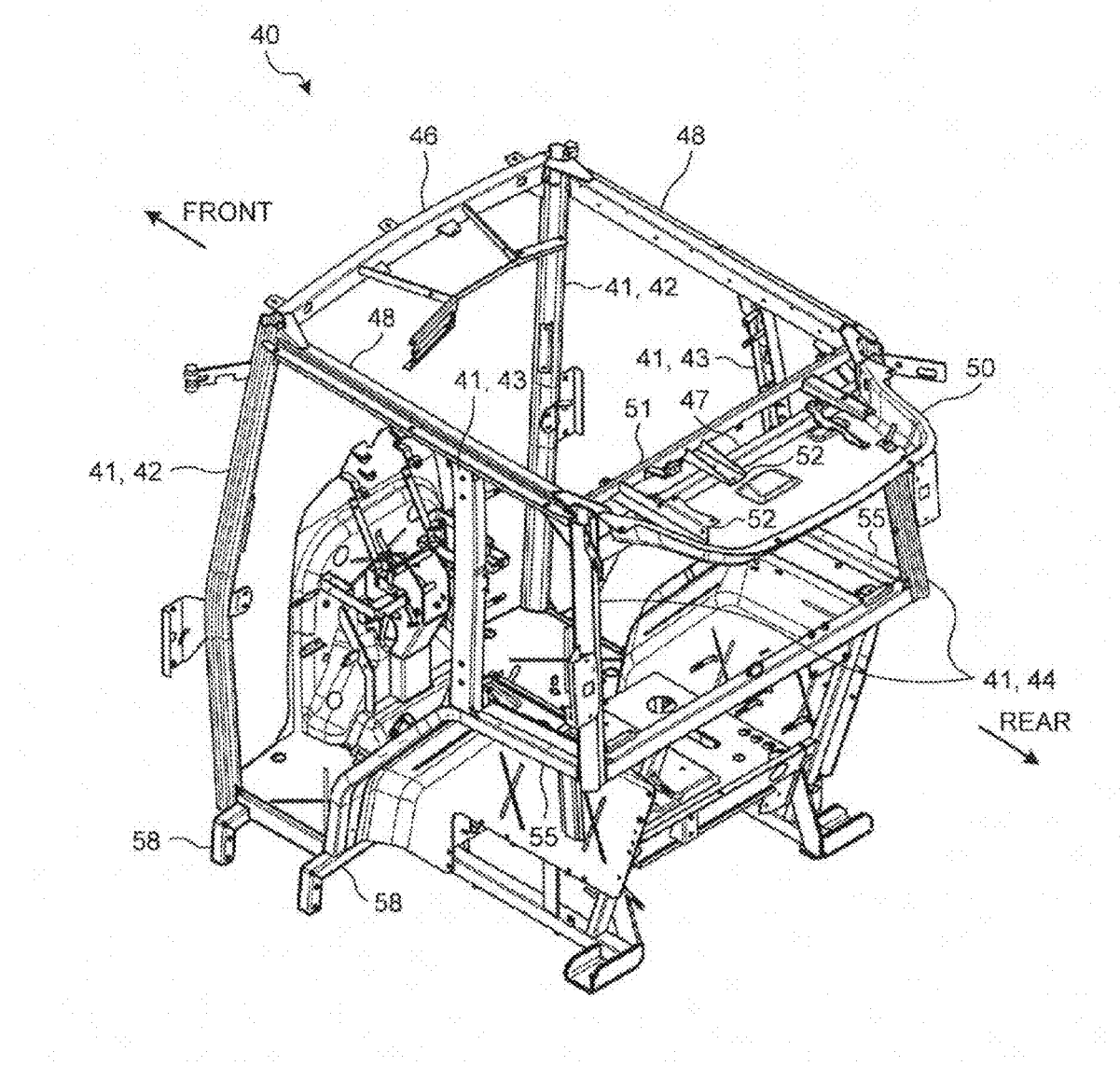
FIG. 6 is a perspective view of a frame of the cabin illustrated in FIG. 1.
Figure 7:
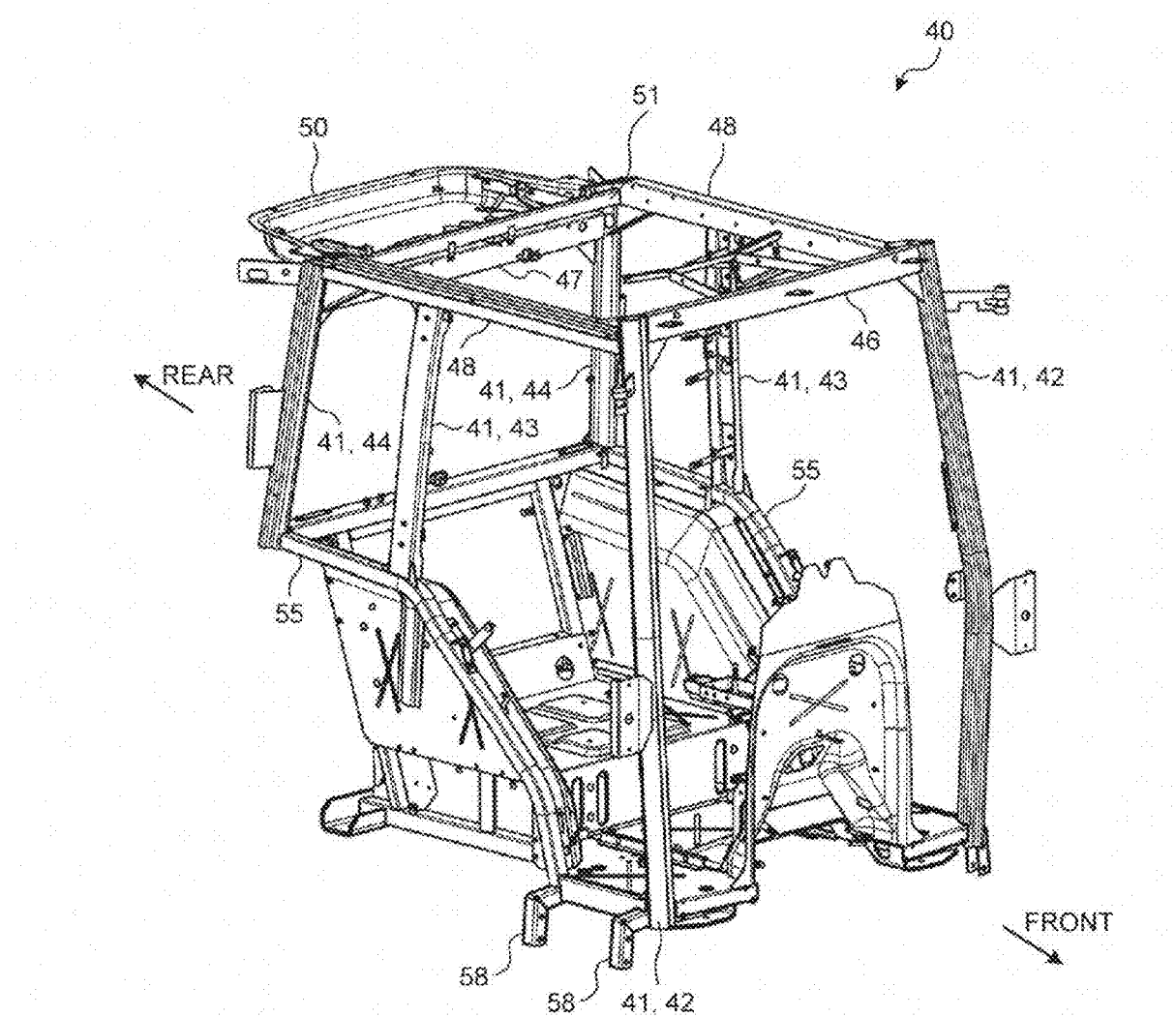
FIG. 7 is a perspective view when the frame illustrated in FIG. 6 is seen from the other direction.

FIG. 6 is a perspective view of the frame of the cabin illustrated in FIG. 1. FIG. 7 is a perspective view when the frame illustrated in FIG. 6 is seen from the other direction. The cabin 10 includes a frame 40, and the frame 40 includes a plurality of pillar frames 41 which become frames of pillars as vertical support posts. That is, the frame 40 includes a front pillar frame 42 which constitutes the front pillar 15, a center pillar frame 43 which constitutes the center pillar 16, and a rear pillar frame 44 which constitutes the rear pillar 17 as the pillar frames 41.

Each of the front pillar frames 42, the center pillar frames 43, and the rear pillar frames 44 is disposed at each of both sides in the left and right direction as in the front pillars 15, the center pillars 16, and the rear pillars 17. Among the pillar frames 41, the front pillar frame 42 and the rear pillar frame 44 are formed in a pipe shape of which the inside is formed as a cavity. Further, as the shape in the extension direction of the center pillar frame 43, that is, the shape of the center pillar frame 43 in the up and down direction, the center pillar frame 43 is substantially formed in a U-shape.

Further, the portions near the upper ends of the pillar frames 41 are connected to each other by the other member. That is, a front cross member 46 which extends in the left and right direction is disposed between the upper ends of the front pillar frames 42 positioned at both left and right sides, and both portions near the upper ends of the front pillar frames 42 at two positions are connected to the front cross member 46. Similarly, a rear cross member 47 which extends in the left and right direction is disposed between the upper ends of the rear pillar frames 44 positioned at both left and right sides, and both portions near the upper ends of the rear pillar frames 44 at two positions are connected to the rear cross member 47. The front cross member 46 and the rear cross member 47 are respectively connected to the side surfaces of the portions near the upper ends of the front pillar frames 42 and the rear pillar frames 44.

Further, a side member 48 which extends in the front and rear direction is disposed between the portion near the upper end of the front pillar frame 42 and the portion near the upper end of the rear pillar frame 44. All portions near the upper ends of the front pillar frame 42 and the rear pillar frame 44 are connected to the side member 48. Further, the center pillar frame 43 which is positioned between the front pillar frame 42 and the rear pillar frame 44 is also connected to the side member 48, and the side members 48 are disposed at both sides in the left and right direction.

Among these connections, as for the connection of the side member 48 with respect to the front pillar frame 42 and the rear pillar frame 44, the side member 48 is connected to the side surfaces of the portions near the upper ends of the front pillar frame 42 and the rear pillar frame 44. For this reason, the upper ends of the front pillar frame 42 and the rear pillar frame 44 are opened. On the contrary, as for the connection between the side member 48 and the center pillar frame 43, the upper end of the center pillar frame 43 is connected to the side surface of the side member 48.

Further, an air conditioner cover portion 50 which covers the lower side of the air conditioning unit 71 is provided at the rear side of the rear cross member 47 in the front and rear direction of the tractor 1. The air conditioner cover portion 50 is formed in a tray shape, and is disposed at the rear side of the rear cross member 47 between the left and right rear pillar frames 44.

Further, a bracket installation frame 51 which extends in the left and right direction as in the rear cross member 47 is disposed above the rear cross member 47 between the rear ends of the side members 48 so as to be parallel to the rear cross member 47. Specifically, the rear cross member 47 is connected to the position slightly below the upper end of the rear pillar frame 44, and the bracket installation frame 51 is connected to the position above the rear pillar frame 44.

A bracket 52 attached with the air conditioning unit 71 is connected to the bracket installation frame 51. A plurality of the brackets 52 extend from the bracket installation frame 51 toward the rear side of the bracket installation frame 51, and the plurality of brackets 52 are all positioned above the air conditioner cover portion 50.

Further, a fender frame 55 is disposed in the frame 40 at a position where the fender 33 is disposed. Since the fender frame 55 is formed along the fender 33, the fender frame is provided forward from the upper side of the rear wheel 4 in a state where the rear wheel 4 is disposed. The fender frame 55 is also formed by a member that is formed in a pipe shape as in the pillar frame 41. That is, the fender frame 55 is formed by a pipe-like member that extends in the front and rear direction in the vicinity of the upper side of the rear wheel 4 so as to be disposed forward from the upper side of the rear wheel 4 in a state where the rear wheel 4 is disposed and is curved so as to extend in the up and down direction in the vicinity of the front side of the rear wheel 4.

Further, as for the fender frame 55 which is formed in this way, the rear end of the portion extending in the front and rear direction is connected to the side surface of the portion near the lower end of the rear pillar frame 44. The portion of the rear pillar frame 44 which is connected to the fender frame 55 is opened, and the inside of the rear pillar frame 44 and the inside of the fender frame 55 communicate with each other.

Further, the lower end of the portion extending in the up and down direction of the fender frame 55 is connected to a step frame 58 as a portion to be attached with the step 31. The step frame 58 is formed in a manner such that the upper end of the pipe-like member extending in the up and down direction is connected to the end of the pipe-like member extending in the left and right direction, and the step 31 is attached to the portion which extends in the up and down direction. That is, in the step 31, an attachment member 32 (see FIG. 2) which is a pipe-like member included in the step 31 is inserted and fixed to the portion which extends in the up and down direction in the step frame 58.

The fender frame 55 is connected to a portion which extends in the left and right direction in the step frame 58, and a portion of the step frame 58 which is connected to the fender frame 55 is opened. For this reason, the inside of the step frame 58 and the inside of the fender frame 55 communicate with each other.

Figure 8:
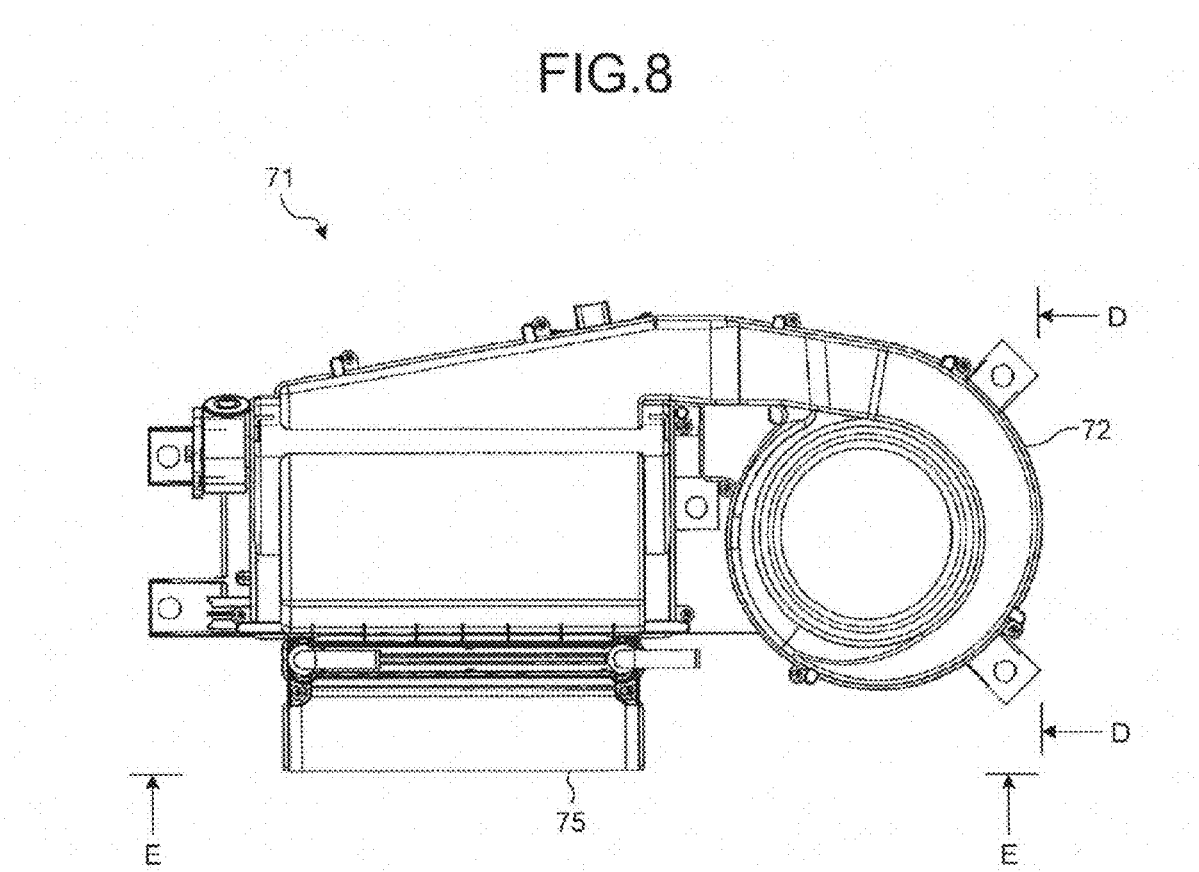
FIG. 8 is a top view of an air conditioning unit.
Figure 9:
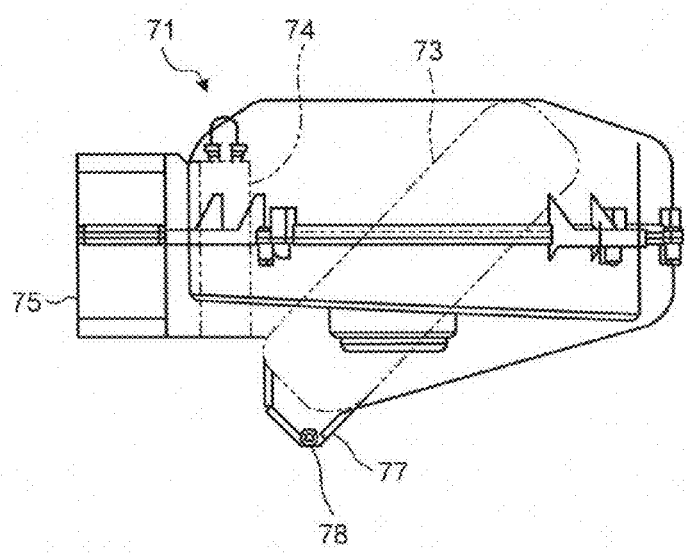
FIG. 9 is an arrow view taken along line D-D of FIG. 8.
Figure 10:
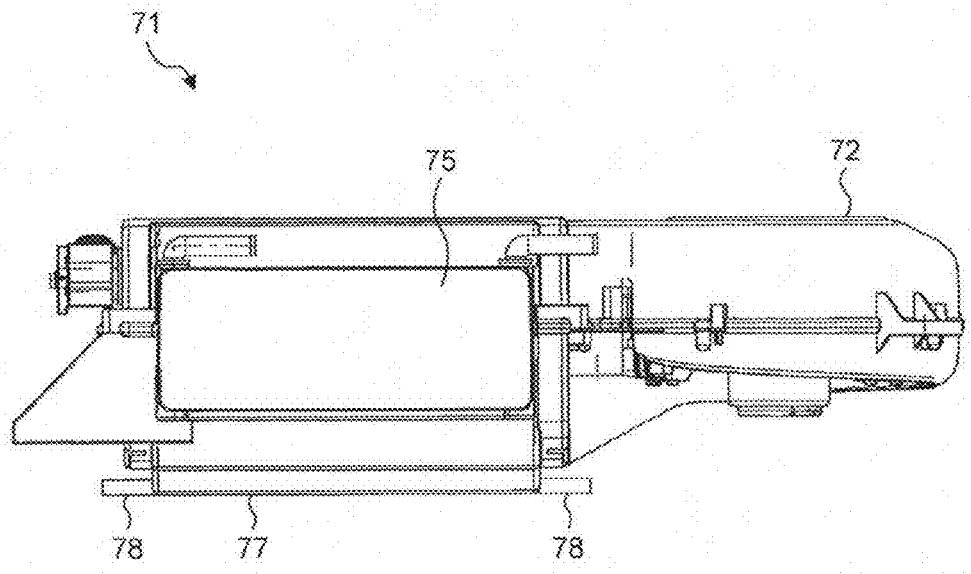
FIG. 10 is an arrow view taken along line E-E of FIG. 8.

FIG. 8 is a top view of the air conditioning unit. FIG. 9 is an arrow view taken along line D-D of FIG. 8. FIG. 10 is an arrow view taken along line E-E of FIG. 8. The air conditioning unit 71 includes a blower 72 which suctions and blows air, and the passageway of the air which blows by the blower 72 is provided with an evaporator 73 which performs a heat exchange operation between the air and a refrigerant used in the air conditioner 70, a heater core 74 which performs a heat exchange operation between the air blowing by the blower 72 and cooling water of the engine, and a unit outlet 75 which blows the air having been subjected to the heat exchange operation by the evaporator 73 or the heater core 74 toward the air conditioning duct 38. Furthermore, the evaporator 73 includes an expansion valve therein, and may perform a heat exchange operation between the refrigerant evaporated by the expansion valve and the air blown by the blower 72. Further, since the evaporator 73 and the heater core 74 perform a heat exchange operation on the air blown by the blower 72, the evaporator 73 and the heater core 74 are disposed between the downstream side of the blower 72 and the unit outlet 75.

Further, a water collecting unit 77 which collects the moisture in the air condensed by a decrease in the temperature of the air through the heat exchange operation in the evaporator 73 is provided below the evaporator 73, and the water collecting unit 77 is provided with a drain portion 78 which drains the water inside the water collecting unit 77 to the outside of the air conditioning unit 71. The drain portion 78 has a short pipe shape and is provided at two positions in the water collecting unit 77, and the drain portions 78 at two positions are directed so as to protrude toward the opposite directions while being opened. Further, the drain portions 78 at two positions all protrude in a direction perpendicular to the opening direction of the unit outlet 75 while being opened.

The air conditioning unit 71 which is provided in this way may change the amount of the air blowing from the unit outlet 75 by driving the blower 72 in response to the operation of the air conditioner operating unit 35.

Figure 11:
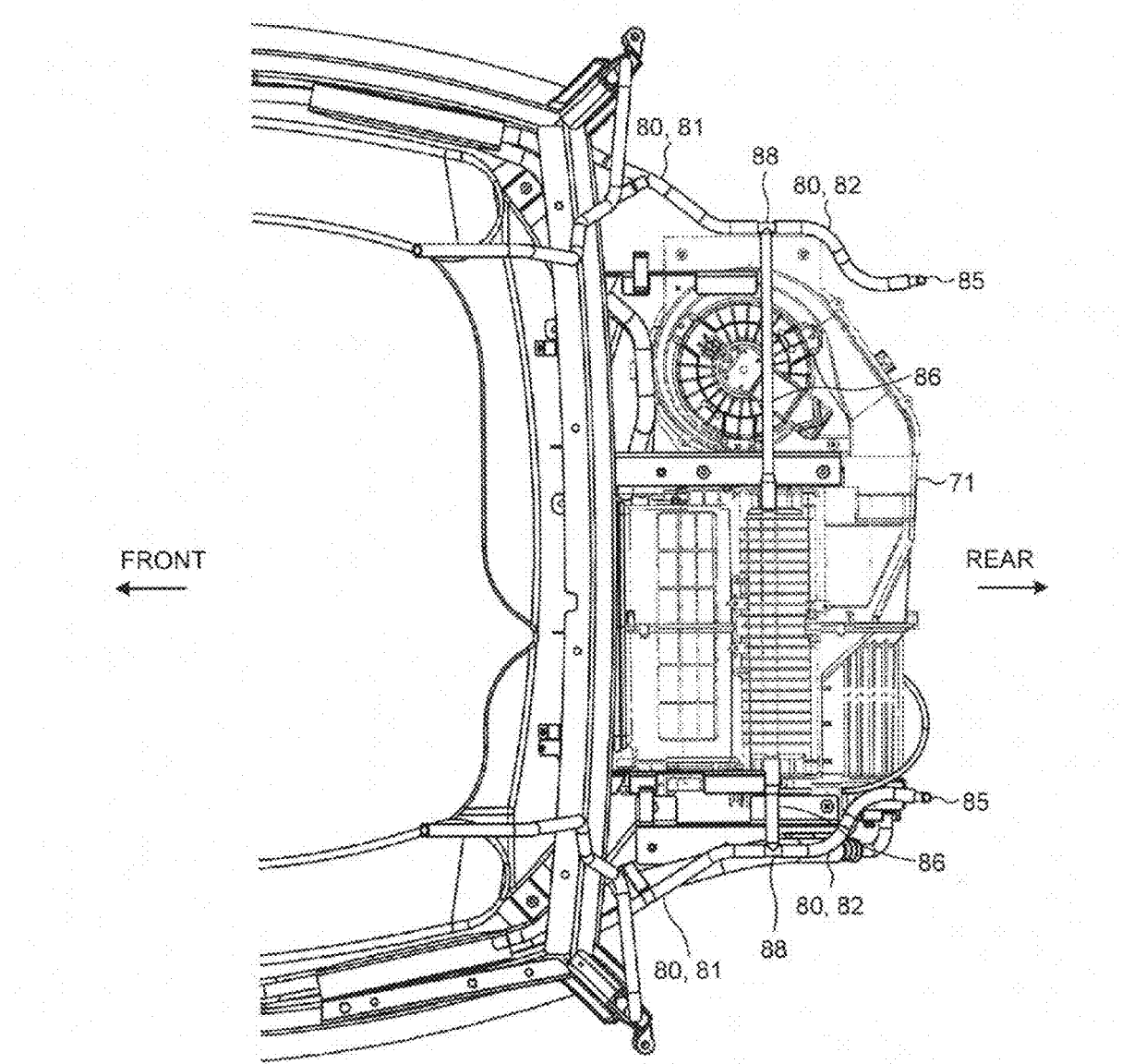
FIG. 11 is an arrow view taken along line F-F of FIG. 4 and is a bottom view of an air conditioning unit in a state where an air conditioning unit is installed in an air conditioner installation portion.

FIG. 11 is an arrow view taken along line F-F of FIG. 4, and is a bottom view of the air conditioning unit in a state where the air conditioning unit is installed in the air conditioner installation portion. The air conditioning unit 71 is installed in the air conditioner installation portion 13 by being held by the brackets 52. As for the direction, the unit outlet 75 is opened toward the front side of the tractor 1 and the water collecting unit 77 is positioned at the lower side. The air conditioning unit 71 is attached to the bracket 52 in a direction in which the drain portions 78 which are installed at two positions of the water collecting unit 77 face the left or right side in the left and right direction of the tractor 1.

A drain portion hose 86 as a drainage member is connected to each of two drain portions 78 which are positioned at the lower side of the air conditioning unit 71 and protrude in the left and right direction. In a state where one-side ends of the drain portion hoses 86 are connected to the drain portions 78 and the other-side ends thereof are attached to the brackets 52, the drain portion hoses 86 are positioned near the portions where the ends of the air conditioning unit 71 in the left and right direction of the tractor 1 are positioned. That is, the drain portion hose 86 is provided so as to face outward in the left and right direction of the tractor 1 from the drain portion 78.

Furthermore, since the drain portions 78 at two positions have different distances with respect to the positions of the ends of the air conditioning unit 71, the lengths of the drain portion hoses 86 connected to the respective drain portions 78 are also different depending on the drain portion 78 to which the drain portion hose 86 is connected.

A T-shaped joint 88 which has a connection portion for three directions is connected to the end opposite to the end of the drain portion hose 86 connected to the drain portion 78. In the T-shaped joint 88, two connection portions among three connection portions face the opposite directions in a straight line, and the remaining one connection portion is formed so as to face a direction perpendicular to the other two connection portions. The connection portion which is perpendicular to the other two connection portions among three connection portions of the T-shaped joint 88 is connected to the end of the drain portion hose 86. Further, the other two connection portions of the T-shaped joint 88 are connected to the ends of the drain portion hoses 86 so as to face the front and rear direction of the tractor 1.

Drain hoses 80 which drain the water discharged from the drain portion 78 to the outside of the tractor 1 are respectively connected to two connection portions other than the end connected to the drain portion hose 86 in three connection portions of the T-shaped joint 88. Since two connection portions of the T-shaped joint 88 connected to the drain hoses 80 face the front and rear direction of the tractor 1, the drain hoses 80 which are connected to the connection portions are also disposed respectively at the front side and the rear side of the tractor 1 from the T-shaped joint 88. In this way, among the drain hoses 80 connected to the T-shaped joint 88, the drain hose 80 which is disposed at the front side becomes a front drain hose 81 and the drain hose 80 which is disposed at the rear side becomes a rear drain hose 82. That is, a portion of the drain hose 80 which is positioned at the front side in relation to the air conditioning unit 71 becomes a front drain hose 81, and a portion of the drain hose 80 which is positioned at the rear side in relation to the air conditioning unit 71 becomes a rear drain hose 82.

Since the drain portion hose 86 and the drain hose 80 are connected to each other through the T-shaped joint 88 in this way, the drain hose 80 is connected to the drain portion hose 86 while being branched into two directions of the front and rear direction of the tractor 1. Further, the drain portion hose 86 is connected to the drain portion 78 of the air conditioning unit 71, and the drain hose 80 is connected to the T-shaped joint 88 connected to the drain portion hose 86. In other words, the drain portion 78 and the drain hose 80 are connected to each other through the drain portion hose 86. Further, since the T-shaped joint 88 or the drain hose 80 is connected to the drain portion hoses 86 which are positioned at both sides in the left and right direction of the tractor 1, the front drain hose 81 or the rear drain hose 82 are also disposed at both sides in the left and right direction of the tractor 1.

Figure 12:
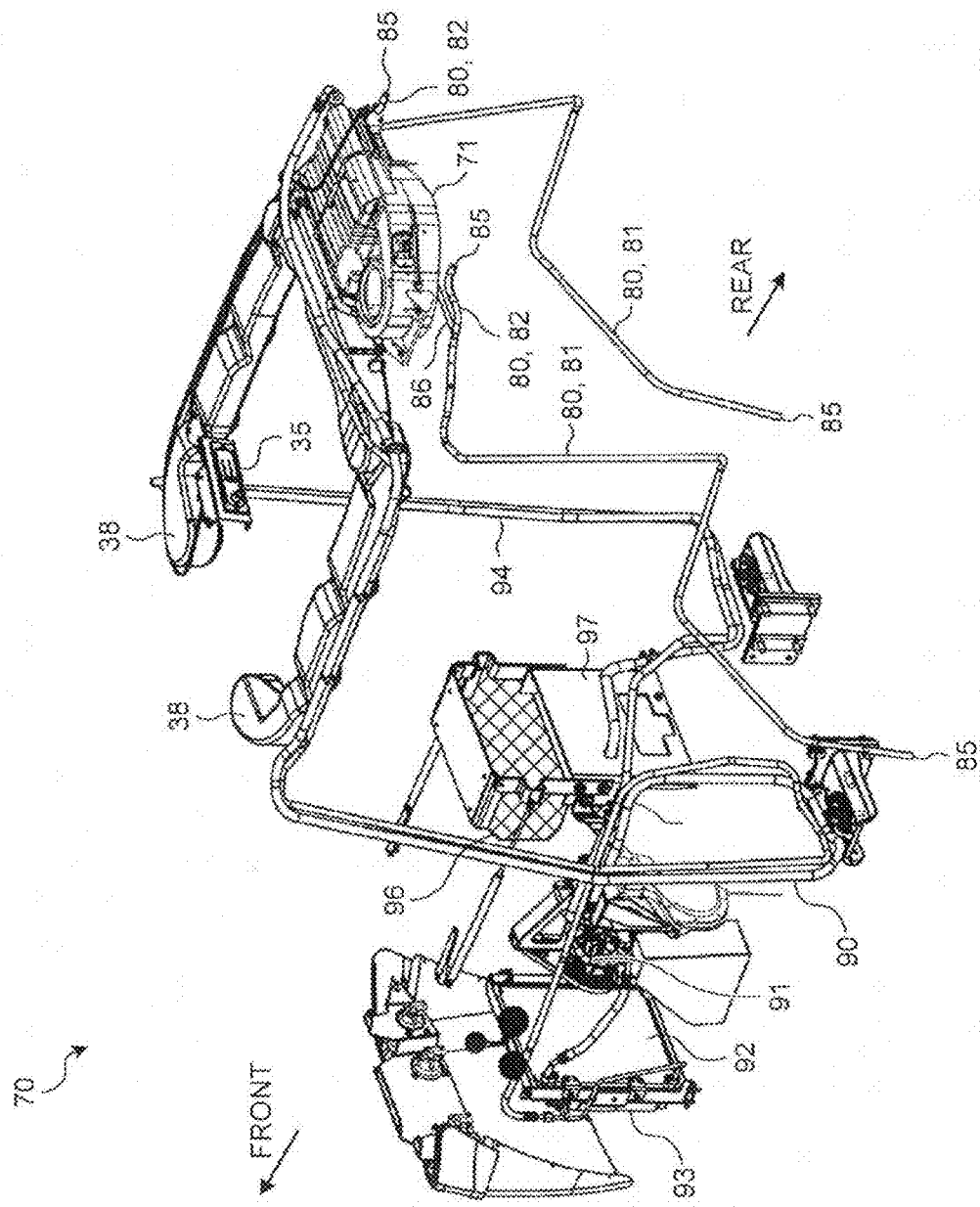
FIG. 12 is a schematic diagram illustrating an entire configuration of an air conditioner which is provided in the tractor illustrated in FIG. 1.

FIG. 12 is a schematic diagram illustrating an entire configuration of the air conditioner which is provided in the tractor illustrated in FIG. 1. The air conditioner 70 which is provided in the tractor 1 mainly includes the air conditioning unit 71 and a unit which is connected to the air conditioning unit 71 through a fluid passageway. A cooler pipe 90 as a refrigerant passageway through which a refrigerant used for a heat exchange operation with air in the evaporator 73 and a heater pipe 94 as a heat medium passageway through which cooling water of the engine used for a heat exchange operation with air in the heater core 74 are connected to the air conditioning unit 71 which constitutes the air conditioner 70.

Among these, respective units included in the air conditioner 70 are connected to the cooler pipe 90. That is, for example, a compressor 91 which is driven by the power generated by the engine so as to compress a refrigerant, a condenser 92 as a condensing appliance which performs a heat exchange operation between an atmosphere and a refrigerant increased in temperature by the compression so as to cool the refrigerant and liquefies the gaseous refrigerant, and a receiver dryer 93 which separates a liquid and a gas in the refrigerant from each other and removes the moisture in the refrigerant are connected to the cooler pipe 90. The units such as the compressor 91, the condenser 92, and the receiver dryer 93 are arranged inside the hood 6 of the front portion of the body.

The cooler pipe 90 and the heater pipe 94 through which the refrigerant or the cooling water to be subjected to the heat exchange operation in the evaporator 73 or the heater core 74 and the cooler pipe 90 and the heater pipe 94 through which the refrigerant or the cooling water having been subjected to the heat exchange operation are respectively connected to the air conditioning unit 71. For this reason, the air conditioning unit 71 may cool or heat the air flowing into the cabin 10 by performing a heat exchange operation between the refrigerant flowing from the cooler pipe 90 or the cooling water flowing from the heater pipe 94 and the air flowing into the cabin 10 through the evaporator 73 or the heater core 74.

Further, in this way, the cooler pipes 90 before and after the heat exchange operation are respectively connected to the air conditioning unit 71 and are disposed so that the refrigerant after the heat exchange operation flows to the unit such as the compressor 91 again, whereby the refrigerant circulation path is formed.

Here, the respective units such as the compressor 91 are disposed inside the hood 6, but a power source such as an engine is also disposed inside the hood 6 and increases in temperature when driving the power source. Particularly, a DPF (Diesel Particulate Filter) 96 as a filter which reduces a particulate material contained in an exhaust gas discharged from the engine may easily rise in temperature. For this reason, a portion of the cooler pipe 90 which passes the vicinity of the DPF 96 is disposed while avoiding the DPF 96 so as to prevent a thermal influence of the DPF 96.

Specifically, a portion of the cooler pipe 90 which passes the vicinity of the DPF 96 is disposed at the rear side of a DPF bracket 97 which holds the DPF 96. That is, since the condenser 92 performs a heat exchange operation between the refrigerant and the atmosphere, the condenser 92 is comparatively disposed at the front side inside the hood 6 so as to be easily exposed to the external air. For this reason, the cooler pipe 90 is disposed from a position near the front side inside the hood 6 to the rear side of the cabin 10 where the air conditioning unit 71 is positioned, and further includes a portion which is disposed inside the hood 6 in the left and right direction.

In this way, the DPF 96 which is disposed inside the hood 6 is disposed at a position comparatively near the rear side inside the hood 6 as in the cooler pipe 90 disposed inside the hood 6. The DPF 96 is held by the DPF bracket 97 at the position, but the DPF bracket 97 includes a holding portion which practically holds the DPF 96 and an attachment portion which is an attachment part of the DPF bracket 97 inside the hood 6. Among these, the attachment portion is substantially formed in a rectangular plate shape, and the most part thereof is positioned at the rear side inside the hood 6 in relation to the DPF 96 which is held by the holding portion.

In the cooler pipe 90 which is disposed inside the hood 6, a portion which is disposed in the left and right direction passes the rear side of the DPF bracket 97. For this reason, the attachment portion of the DPF bracket 97 is interposed between the cooler pipe 90 and the DPF 96, and a radiation heat from the DPF 96 which increases in temperature is blocked by the attachment portion of the DPF bracket 97. In other words, the DPF bracket 97 also blocks the heat generated from the DPF 96 with respect to the cooler pipe 90.

Further, since the drain hose 80 which is connected to the air conditioning unit 71 is branched into two directions, a drain hose outlet 85 which is an opening positioned at the end of the drain hose 80 and drains the water flowing inside the drain hose 80 is positioned at both front and rear sides with respect to the position of the air conditioning unit 71 in the front and rear direction of the tractor 1. Specifically, in the drain hose 80 which is branched into two directions, the rear drain hose 82 is disposed at a comparatively short length backward from the T-shaped joint 88. For this reason, the drain hose outlet 85 of the rear drain hose 82 is positioned at the rear side in relation to the position of the air conditioning unit 71 in the front and rear direction of the tractor 1 in the vicinity of the air conditioning unit 71.

On the contrary, the front drain hose 81 enters the rear pillar frame 44 from the opening portion of the upper end of the rear pillar frame 44 which is positioned at the front side of the air conditioning unit 71. That is, the front drain hose 81 is connected to the end of the drain portion hose 86 which is positioned near a position where the end of the air conditioning unit 71 in the left and right direction of the tractor 1 is positioned. For this reason, a portion of the front drain hose 81 which is connected to the T-shaped joint 88 is also positioned near a position where the end of the air conditioning unit 71 in the left and right direction is positioned, and the front drain hose 81 is disposed forward from the position.

For this reason, the front drain hose 81 is disposed toward a portion provided with the rear pillar frame 44 from a position connected to the T-shaped joint 88, and the front drain hose 81 enters the rear pillar frame 44 from the opening portion of the upper end of the rear pillar frame 44. Further, the front drain hose 81 enters the fender frame 55 of which the inside communicates with the inside of the rear pillar frame 44 from the vicinity of the lower end of the rear pillar frame 44.

In this way, the drain hose outlet 85 is opened to the inside of the step frame 58 in a state where the end of the front drain hose 81 which enters the fender frame 55 is positioned inside the fender frame 55 or enters the step frame 58 which communicates with the inside of the fender frame 55. That is, the front drain hose 81 is disposed from the rear pillar frame 44 into the fender frame 55, and the drain hose outlet 85 is opened to the inside of the step frame 58.

Figure 13:
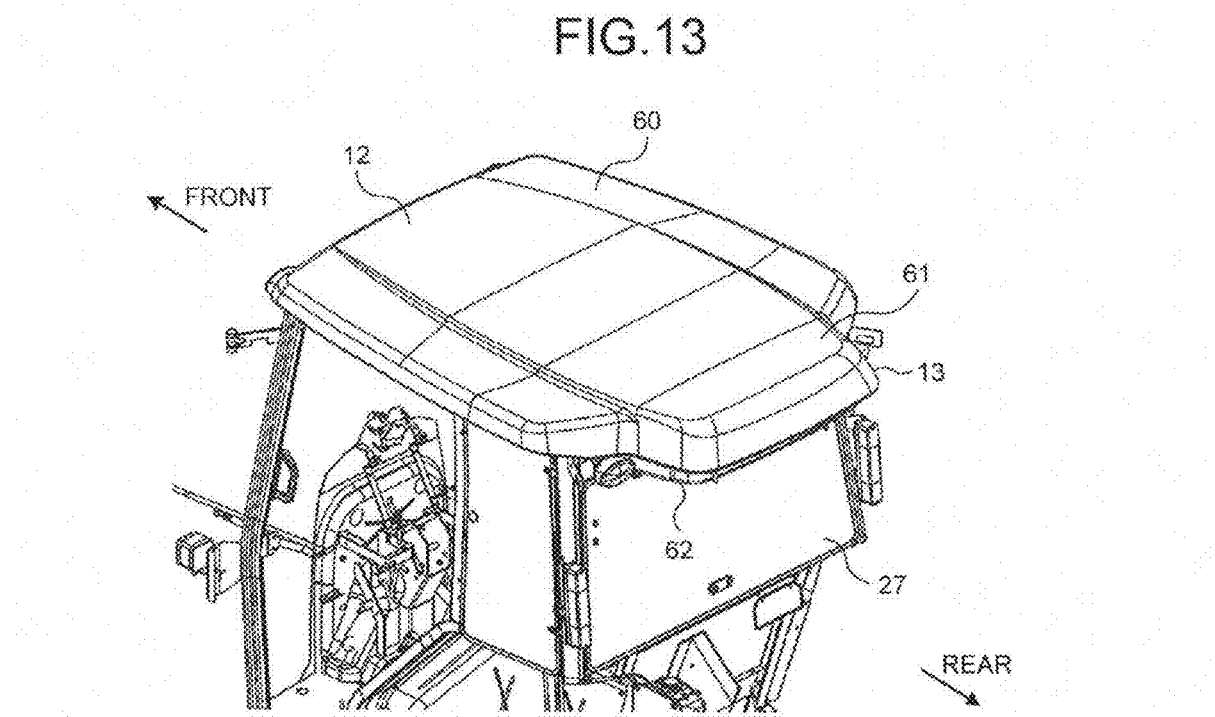
FIG. 13 is a perspective view of a roof near the air conditioner installation portion of the tractor illustrated in FIG. 1.
Figure 14:
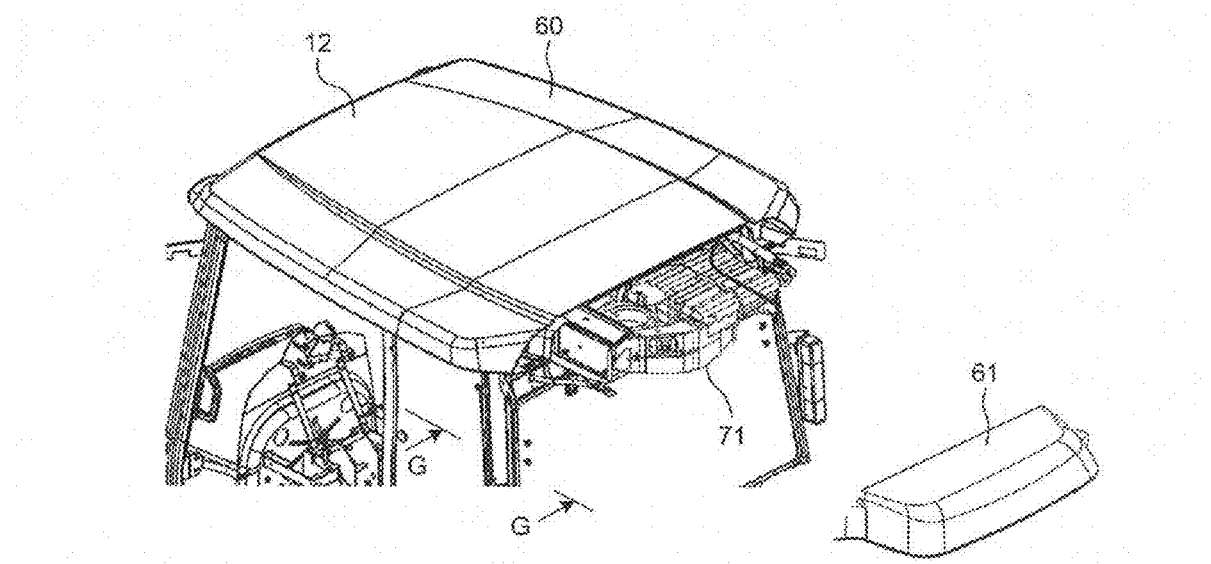
FIG. 14 is a diagram illustrating a state where an air conditioner upper cover illustrated in FIG. 13 is separated.

FIG. 13 is a perspective view of the roof near the air conditioner installation portion of the tractor illustrated in FIG. 1. FIG. 14 is a diagram illustrating a state where the air conditioner upper cover illustrated in FIG. 13 is separated. The roof 12 is formed by attaching a roof cover 60 to the side member 48 and the like included in the frame 40. Further, the rear end of the roof 12 is provided with the air conditioner installation portion 13, and the air conditioner installation portion 13 is provided with an air conditioner upper cover 61 as an upper surface side cover in the air conditioner installation portion 13 and an air conditioner lower cover 62. Accordingly, the outside of the air conditioning unit 71 is covered by both the air conditioner upper cover 61 and the air conditioner lower cover 62. Among these covers, the air conditioner upper cover 61 is disposed so as to be attachable to or detachable from the roof 12 or the frame 40, and the air conditioning unit 71 may be examined by detaching the air conditioner upper cover 61 from the roof 12.

Furthermore, the connection portion of the air conditioner upper cover 61 between the roof cover 60 and the air conditioner upper cover 61 which is installed so as to be detachable from the roof 12 in this way adopts a waterproof structure by using a packing or the like.

Further, the width of the roof 12 when removing the air conditioner installation portion 13 in the left and right direction is widened backward from the front side, and the portion directly before the air conditioner installation portion 13 is the widest. In this way, the portion of the roof 12 which is positioned directly before the air conditioner installation portion 13 and of which the width in the left and right direction is widened is provided with an external air filter (not illustrated) which removes particles or dust of the external air when suctioning the external air upon driving the air conditioning unit 71. When suctioning the external air, the air conditioning unit 71 suctions the external air after removing particles or dust therefrom using the external air filter.

Figure 15:
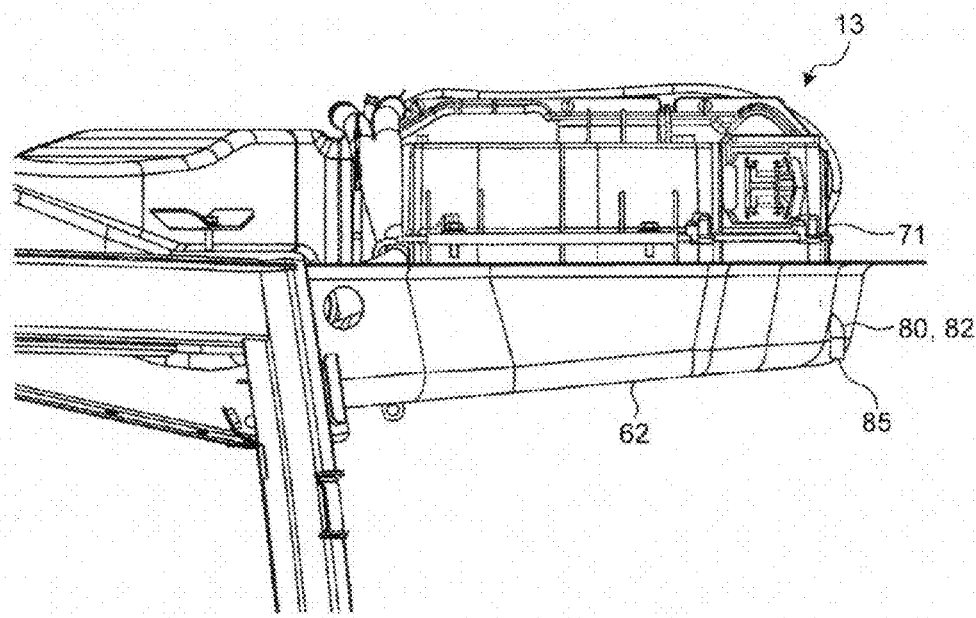
FIG. 15 is an arrow view taken along line G-G of FIG. 14.

FIG. 15 is an arrow view taken along line G-G of FIG. 14. Compared to the attachable or detachable air conditioner upper cover 61, the air conditioner lower cover 62 is provided in the air conditioner installation portion 13 so as not to be easily detached therefrom. As for the air conditioner lower cover 62, the lower surface side is inclined downward as it goes from the rear side to the front side, and is inclined by about 5° with respect to the direction of the road surface on which the tractor 1 runs. The drain portion hose 86 or the drain hose 80 is disposed below the air conditioning unit 71, but a portion of the drain hose 80 positioned below the air conditioning unit 71 or the drain portion hose 86 is covered by the air conditioner lower cover 62.

From the rear side of the air conditioner lower cover 62 which is provided in this way, the vicinity of the rear end of the rear drain hose 82 protrudes outward. That is, the rear drain hose 82 is disposed inside the air conditioner lower cover 62, and the drain hose outlet 85 is exposed to the outside of the air conditioner lower cover 62 from the rear end of the air conditioner lower cover 62. As for a portion of the rear drain hose 82 which is exposed to the outside of the air conditioner lower cover 62 in this way, the vicinity of the rear end is bent downward so that the drain hose outlet 85 is bent downward. Furthermore, the portion of the rear drain hose 82 which is exposed to the outside of the air conditioner lower cover 62 is positioned at the upper side in relation to the lower surface of the air conditioner lower cover 62.

Figure 16:
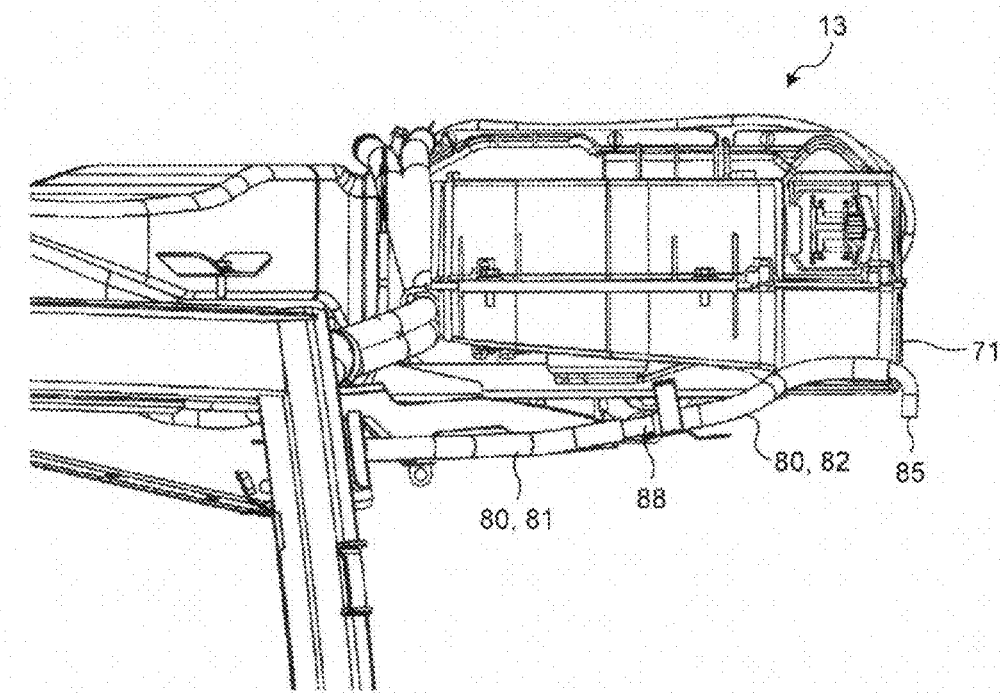
FIG. 16 is a diagram illustrating a case where an air conditioner lower cover illustrated in FIG. 15 is removed.

FIG. 16 is a diagram illustrating a case where the air conditioner lower cover illustrated in FIG. 15 is removed. The lower surface side of the air conditioner lower cover 62 is inclined in a direction in which the front side is positioned at the lower side, but in the drain hose 80, the drain hose 80 which is disposed inside the air conditioner lower cover 62 is also inclined downward as it goes to the front side of the tractor 1.

Specifically, a portion of the drain hose 80 which is covered by the air conditioner lower cover 62 is connected to the T-shaped joint 88, but the T-shaped joint 88 is inclined downward in a direction from the connection portion connected with the rear drain hose 82 toward the connection portion connected with the front drain hose 81. For this reason, in the front drain hose 81 and the rear drain hose 82 which are connected to the connection portions of the T-shaped joint 88, the vicinity of the portion connected to the T-shaped joint 88 is inclined downward in a direction from the rear side toward the front side. Accordingly, the drain hose 80 which is disposed inside the air conditioner lower cover 62 is inclined downward at the front side thereof as in the inclination of the lower surface side of the air conditioner lower cover 62.

Furthermore, it is desirable that the inclination angle of the T-shaped joint 88 which is inclined downward as it goes from the rear side toward the front side be equal to or larger than the inclination angle of the lower surface side of the air conditioner lower cover 62. For example, in a case where the inclination angle of the lower surface side of the air conditioner lower cover 62 is 5°, it is desirable that the inclination angle of the T-shaped joint 88 be inclined by 10° with respect to the direction of the road surface on which the tractor 1 runs.

The air conditioning structure of the tractor 1 according to the embodiment has the above-described configuration, and the operation thereof will be described below. When driving the tractor 1, the driver 100 performs a running operation of the tractor 1 or a manipulating operation of the working machine connected to the connector 8 by operating a handle, various levers, and a pedal inside the cabin 10. Further, the tractor 1 is provided with the air conditioner 70, but the air conditioner 70 is operated by operating the air conditioner operating unit 35 disposed inside the cabin 10.

In a case where the temperature inside the cabin 10 is decreased by the air conditioner 70 through the operation of the air conditioner operating unit 35, the compressor 91 of the air conditioner 70 is first driven by the power generated by the engine. Accordingly, the compressor 91 suctions and compresses the refrigerant inside the cooler pipe 90, so that the refrigerant increases in temperature by the compression. The refrigerant which increases in temperature flows from the compressor 91 to the condenser 92 through the cooler pipe 90. The refrigerant which flows to the condenser 92 decreases in temperature by performing a heat exchange operation between the refrigerant and the air passing through the condenser 92 by the driving of an electric fan (not illustrated). Accordingly, the refrigerant which increases in pressure by the compression of the compressor 91 decreases in temperature, so that the gaseous refrigerant is liquefied by the condenser 92.

The liquefied refrigerant is further separated into a gas and a liquid by the receiver dryer 93 so as to remove moisture therefrom, and only the refrigerant of the liquid flows to the air conditioning unit 71 through the cooler pipe 90. The refrigerant which flows into the air conditioning unit 71 flows to the evaporator 73 included in the air conditioning unit 71. The refrigerant which flows to the evaporator 73 evaporates by the expansion valve, so that the refrigerant decreases in temperature at that time.

On the other hand, when driving the air conditioner 70, the blower 72 of the air conditioning unit 71 is driven so that air blows toward the evaporator 73. The evaporator 73 performs a heat exchange operation between the air flowing outside the evaporator 73 and the low-temperature refrigerant flowing inside the evaporator, so that the temperature of the air decreases. The air which decreases in temperature by the evaporator 73 blows from the unit outlet 75, flows through the air conditioning duct 38, and blows from the outlet 39 provided in the air conditioning duct 38 into the cabin 10. Accordingly, the air which decreases in temperature flows into the cabin 10, so that the temperature inside the cabin 10 decreases. Further, the refrigerant which performs a heat exchange operation by the evaporator 73 flows out of the air conditioning unit 71, and flows to the compressor 91 again through the cooler pipe 90.

On the contrary, in a case where the temperature inside the cabin 10 increases by the air conditioner 70 through the operation of the air conditioner operating unit 35, the cooling water of the engine flows to the air conditioning unit 71 by the heater pipe 94. That is, since the temperature of the cooling water of the engine after the warming-up operation becomes higher than that of the external air, when increasing the temperature inside the cabin 10, the temperature thereof is increased by using the cooling water as a heat medium.

The cooling water which flows into the air conditioning unit 71 by the heater pipe 94 flows to the heater core 74 included in the air conditioning unit 71. When driving the air conditioner 70, the air blowing from the blower 72 flows to the heater core 74, and the heater core 74 performs a heat exchange operation between the air flowing outside the heater core 74 and the high-temperature cooling water flowing inside the heat core so as to increase the temperature of the air. The air which increases in temperature by the heater core 74 blows from the unit outlet 75, flows to the air conditioning duct 38, and blows from the outlet 39 provided in the air conditioning duct 38 into the cabin 10. Accordingly, the high-temperature air flows into the cabin 10, so that the temperature inside the cabin 10 increases. Further, the refrigerant which performs a heat exchange operation by the heater core 74 flows out of the air conditioning unit 71, and flows toward the engine again through the heater pipe 94.

In a case where the temperature inside the cabin 10 is adjusted by driving the air conditioner 70, the temperature is adjusted to a desired temperature by the combination of the method of decreasing the temperature of the air blowing into the cabin 10 through the refrigerant in this way and the method of increasing the temperature of the air by the refrigerant.

The air conditioner 70 adjusts the temperature of the air which blows into the cabin 10 by using the refrigerant and the cooling water in this way, but when the temperature of the air is decreased by performing a heat exchange operation between the air flowing outside the evaporator 73 and the refrigerant flowing inside the evaporator by the evaporator 73, the saturated vapor amount of the air decreases. Accordingly, the moisture in the air may become easily liquefied by condensing the moisture, and the liquefied moisture becomes water. Then, the water adhering to the evaporator 73 gradually flows downward along the evaporator 73. Since the water collecting unit 77 is formed at the lower side of the evaporator 73, the water flows downward from the evaporator 73 is collected in the water collecting unit 77. The water which is collected in the water collecting unit 77 is drained from the drain portion 78 which is provided in the water collecting unit 77, and flows out of the air conditioning unit 71.

The water which is drained from the drain portion 78 flows to the drain portion hose 86 which is connected to the drain portion 78, and further flows from the drain portion hose 86 to the drain hose 80 through the T-shaped joint 88. The drain hose 80 is divided into the front drain hose 81 and the rear drain hose 82 while being branched into two directions by the T-shaped joint 88, but a portion of the drain hose 80 which is covered by the air conditioner lower cover 62 is inclined downward at the front side thereof. For this reason, when the tractor 1 is positioned at the flat road surface or the like so that the ground contact surfaces of the front wheels 3 and the ground contact surfaces of the rear wheels 4 hardly undergo a change in height, the water which flows from the drain portion hose 86 to the drain hose 80 flows toward the front drain hose 81.

Since the front drain hose 81 enters the rear pillar frame 44 from the opening portion of the upper end of the rear pillar frame 44 which extends in the up and down direction, the front drain hose 81 is disposed downward from the opening portion of the upper end of the rear pillar frame 44. For this reason, the water which flows toward the front drain hose 81 flows downward along the front drain hose 81 when reaching a portion of the front drain hose 81 which is disposed inside the rear pillar frame 44.

The water which reaches a position of the front drain hose 81 near the lower end of the rear pillar frame 44 further flows to a portion of the front drain hose 81 which enters the fender frame 55. As for the front drain hose 81 which is disposed inside the fender frame 55, the drain hose outlet 85 is opened into the step frame 58. For this reason, the water which flows to the portion of the front drain hose 81 is drained from the drain hose outlet 85, and flows into the step frame 58.

The water which is drained from the drain hose outlet 85 flows into a portion of the step frame 58 which extends in the left and right direction, and the water further flows to a portion of the step frame 58 which extends in the up and down direction. The attachment member 32 of the step 31 is inserted into the portion of the step frame 58, so that both insides communicate with each other. For this reason, the water which flows into the step frame 58 flows into the attachment member 32 of the step 31, and flows from the lower side of the attachment member 32. The water which flows to the front drain hose 81 is drained from the lower side of the step 31 in this way.

On the contrary, the ground contact surface of the front wheel 3 becomes higher than the ground contact surface of the rear wheel 4, so that the tractor 1 is inclined downward at the rear side thereof as a whole. Accordingly, when the drain hose 80 inside the air conditioner lower cover 62 is also inclined downward at the rear side thereof, the water which flows from the drain portion hose 86 to the drain hose 80 flows toward the rear drain hose 82. The rear end of the rear drain hose 82 is exposed to the outside of the air conditioner lower cover 62 from the rear end of the air conditioner lower cover 62, and the drain hose outlet 85 is bent in the downward direction. For this reason, the water which flows toward the rear drain hose 82 is drained from the drain hose outlet 85 of the rear drain hose 82.

Further, when the amount of the water which flows from the drain portion hose 86 to the drain hose 80 is large regardless of the inclination direction of the tractor 1, the water flows from the drain portion hose 86 to the drain hose 80 which is divided into the front drain hose 81 and the rear drain hose 82. Accordingly, the large amount of water which flows to the drain hose 80 is drained from the drain hose outlet 85 of both the front drain hose 81 and the rear drain hose 82.

In the air conditioning structure of the tractor 1 with the above-described configuration, the drain hose 80 which is disposed along the front and rear direction is disposed at each of both left and right sides of the drain portions 78 of the air conditioning unit 71 disposed at the rear upper portion of the cabin 10, and the drain hose outlet 85 of the drain hose 80 is disposed at each of both left and right sides of the position of the air conditioning unit 71 in the front and rear direction of the tractor 1. Accordingly, the water which is drained from the air conditioning unit 71 when operating the air conditioner 70 may be drained from at least any drain hose outlet 85 regardless of the inclination state of the tractor 1. Further, since a plurality of the drain hose outlets 85 are provided, it is possible to drain the water from the plurality of drain hose outlets 85 even when the amount of the water drained from the air conditioning unit 71 is large. As a result, it is possible to smoothly drain the water.

Further, the front drain hose 81 passes from the inside of the air conditioner lower cover 62 to the inside of the rear pillar frame 44, and the drain hose outlet 85 is positioned at the lower side of the cabin 10, whereby the front drain hose 81 may not be easily seen from the outside. Further, the rear drain hose 82 is disposed inside the air conditioner lower cover 62, and the drain hose outlet 85 is exposed to the outside of the air conditioner lower cover 62 from the rear end of the air conditioner lower cover 62, whereby the rear drain hose 82 also may not be easily seen from the outside. For these reasons, the front drain hoses 81 and the rear drain hoses 82 all may not be easily seen from the outside, which may improve the appearance. As a result, it is possible to smoothly drain the water and improve the appearance at the same time.

Further, since the drain hose 80 which is disposed inside the air conditioner lower cover 62 is inclined downward at the front side thereof, most of the water which is discharged from the air conditioning unit 71 may be drained from the drain hose outlet 85 of the front drain hose 81. Accordingly, when draining the water discharged from the air conditioning unit 71 from the drain hose 80 upon driving the air conditioner 70, the drain hose 80 may not be easily seen from the outside. As a result, it is possible to smoothly drain the water and improve the appearance at the same time with high reliability.

Further, since the drain hose 80 is branched into two directions while being connected to the drain portion hose 86 connected to the drain portion 78 of the air conditioning unit 71 through the T-shaped joint 88, it is possible to ensure the amount of the water which may flow to the drain hose 80 per unit time. As a result, it is possible to smoothly drain the water with high reliability.

Further, since a portion of the rear drain hose 82 which is exposed to the outside of the air conditioner lower cover 62 is positioned above the lower surface of the air conditioner lower cover 62, it is possible to flatten the lower surface side of the air conditioner installation portion 13. As a result, it is possible to improve the safety and further reliably improve the appearance.

Further, since the air conditioner upper cover 61 is provided in an attachable and detachable manner, it is possible to easily examine the air conditioning unit 71 by easily detaching the air conditioner upper cover 61 when examining the air conditioning unit. As a result, it is possible to improve the maintenance workability.

Modified Example

Figure 17:
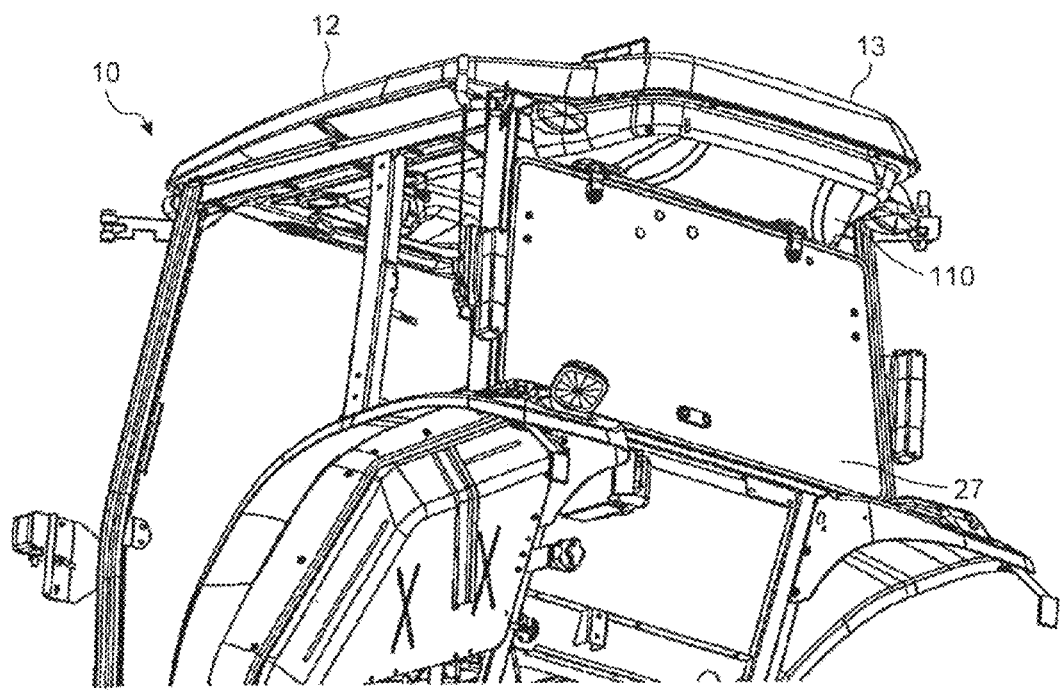
FIG. 17 is a diagram illustrating a modified example of the tractor according to the embodiment and illustrating a case where a sun visor is provided in a rear window.
Figure 18:
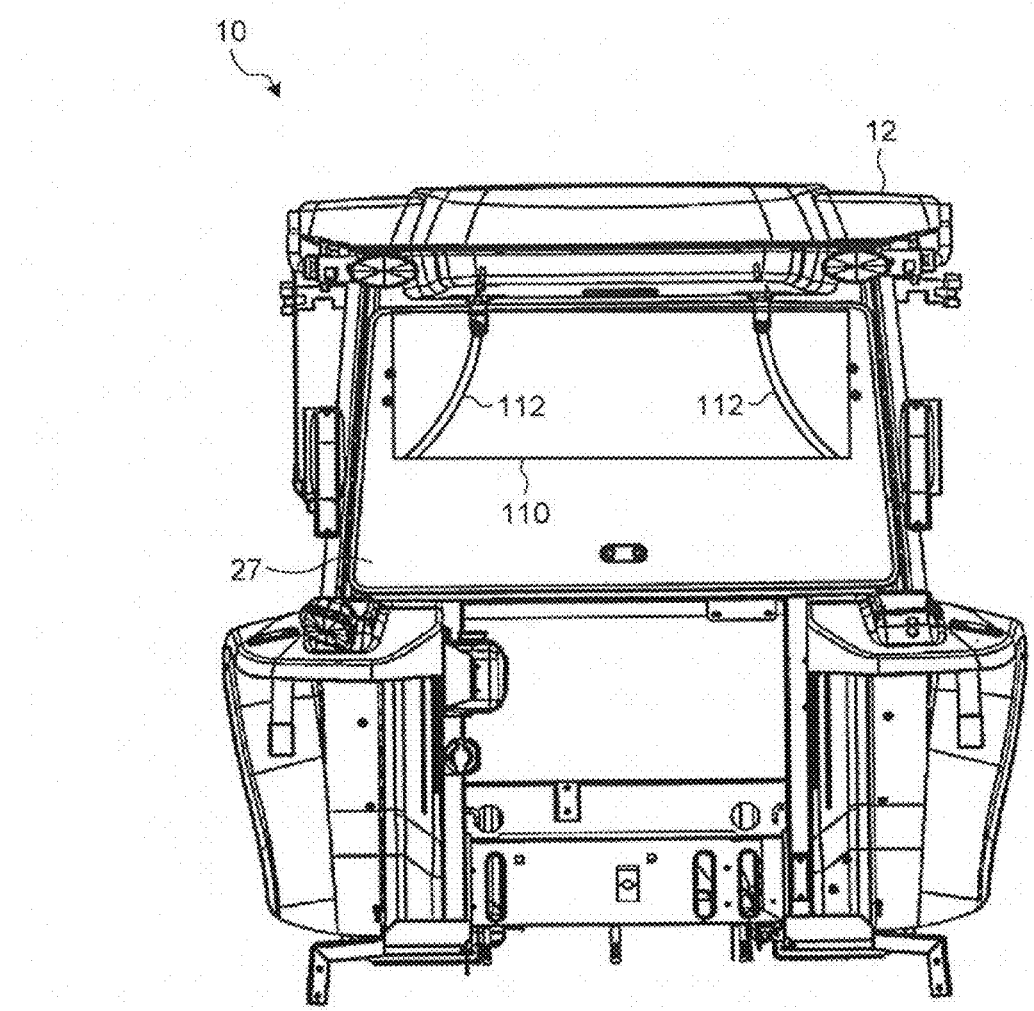
FIG. 18 is a diagram illustrating a state where the sun visor illustrated in FIG. 17 is lowered.
Figure 19:
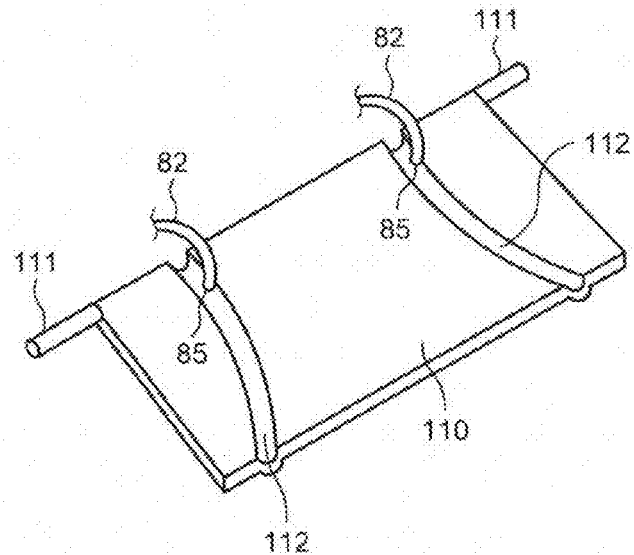
FIG. 19 is a perspective view of the sun visor illustrated in FIG. 18.

FIG. 17 is a diagram illustrating a modified example of the tractor according to the embodiment and illustrating a case where a sun visor is provided at the rear window. FIG. 18 is a diagram illustrating a state where the sun visor illustrated in FIG. 17 is lowered. FIG. 19 is a perspective view of the sun visor illustrated in FIG. 18. Furthermore, in the above-described air conditioning structure, the rear end of the rear drain hose 82 provided with the drain hose outlet 85 is exposed from the air conditioner lower cover 62, and the water is drained from the rear drain hose 82 at a comparatively high position. However, the drainage may be performed toward the operator. For example, as illustrated in FIGS. 17 and 18, a sun visor 110 which blocks the sunlight toward the cabin 10 from the rear window 27 is provided at the rear side of the rear window 27, and the drainage from the rear drain hose 82 may not be performed toward the operator by using the sun visor 110.

Specifically, the sun visor 110 is substantially formed in a rectangular plate shape, and both ends of one side are provided with a rotary shaft 111 of which the direction along the side becomes the axial direction. The sun visor 110 is disposed at the lower surface side of the air conditioner installation portion 13 in a state where the rotary shaft 111 is positioned near the rear end of the lower surface side of the air conditioner installation portion 13 which is provided so as to protrude toward the rear side of the cabin 10. The axial direction of the rotary shaft 111 faces the left and right direction of the tractor 1, and the sun visor 110 is disposed at the lower surface side of the air conditioner installation portion 13 so as to be rotatable about the rotary shaft 111.

Further, the lower surface side of the sun visor 110 is provided with two groove portions 112 in a state where the sun visor 110 is positioned at the lower side of the air conditioner installation portion 13 so that the sun visor 110 rotates about the rotary shaft 111 so as to overlap the lower surface of the air conditioner installation portion 13. The groove portion 112 is formed from the side having the rotary shafts 111 formed at both ends thereof to the side facing the side. Further, the positions where two groove portions 112 are formed on the side having the rotary shafts 111 formed at both ends thereof are substantially equal to the positions of two rear drain hoses 82 which are exposed from the air conditioner lower cover 62 at the rear end of the air conditioner installation portion 13. That is, the respective one-side ends of two groove portions 112 and the drain hose outlets 85 of two rear drain hoses 82 are positioned at the rear end of the air conditioner installation portion 13. However, one-side ends of the groove portion 112 and the drain hose outlets 85 of the rear drain hoses 82 are substantially present at the same position in the left and right direction of the tractor 1.

Further, as for the other-side ends of the groove portions 112, the gap between two groove portions 112 is wider than the gap between the drain hose outlets 85 of two rear drain hoses 82. That is, as for the two groove portions 112, the gap between the groove portions 112 is widened from the side provided with the rotary shaft 111 toward the opposite side.

When the sun visor 110 with the above-described configuration is not used, the sun visor 110 is rotated about the rotary shaft 111, so that the sun visor 110 overlaps the lower surface of the air conditioner installation portion 13 and is positioned below the air conditioner installation portion 13 (FIG. 17). Accordingly, when the driver sees the outside from the inside of the cabin 10 through the rear window 27, the driver 100 may see the outside since no object disturbing the view is present between the inside and the outside of the cabin 10.

On the contrary, when the sun visor 110 is used, the sun visor 110 is rotated about the rotary shaft 111, so that the sun visor 110 is lowered to the extent that the side near the rotary shaft 111 is positioned at the upper end of the sun visor 110 (FIG. 18). Accordingly, since the sunlight from the rear side may not easily reach the rear window 27 due to the sun visor 110 which blocks the sunlight, the sunlight hardly enters the cabin 10, so that the driver 100 is not dazzled.

Here, the positions of the groove portions 112 of the sun visor 110 in the left and right direction of the tractor 1 are substantially the same as the positions of the drain hose outlets 85 of the rear drain hoses 82. For this reason, when the water is drained from the drain hose outlets 85 of the rear drain hoses 82 by driving the air conditioner 70 in this state, the water flows to the groove portions 112 of the sun visor 110.

The water which flows to the groove portion 112 flows along the groove portion 112, flows toward the opposite side to the side with the rotary shaft 111, and is drained from the end of the groove portion 112. Accordingly, since the water which is discharged from the rear drain hose 82 is drained while being distributed to both left and right sides of the sun visor 110, the water hardly flows to the operator, for example, when attaching or detaching the working machine to or from the connector 8.

Figure 20:
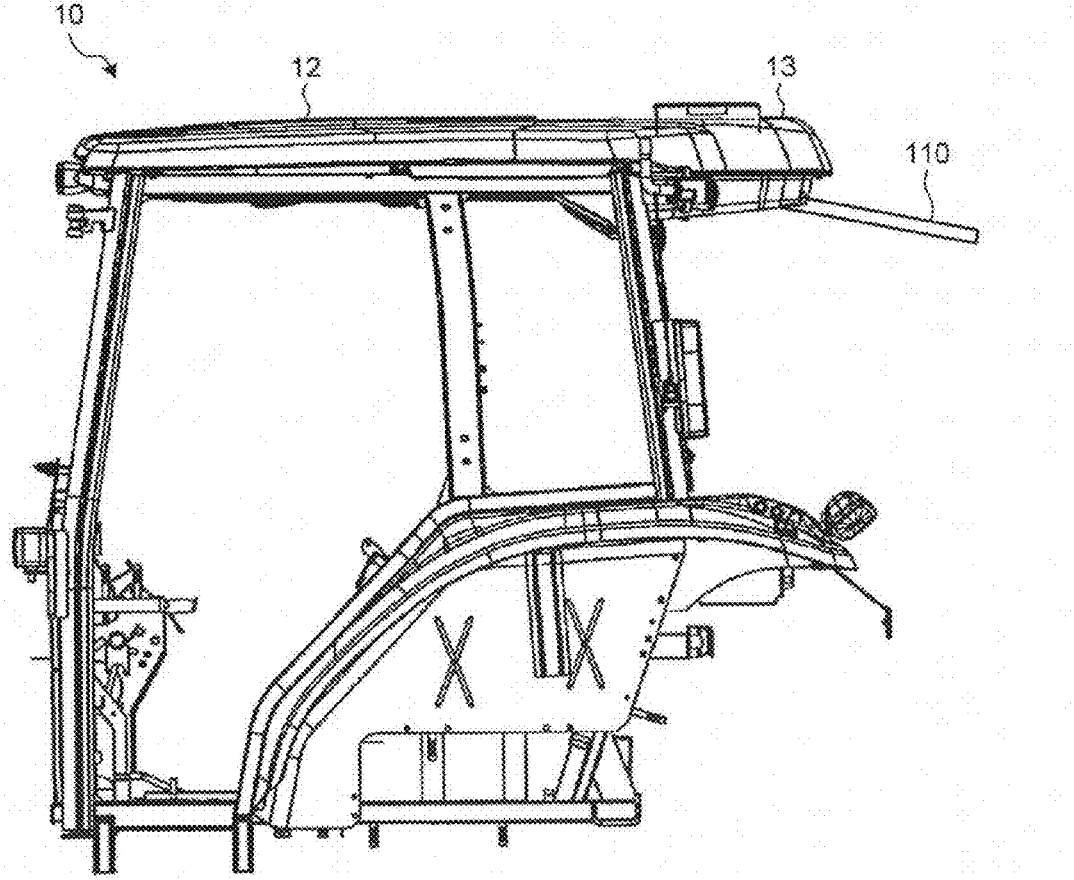
FIG. 20 is a diagram illustrating a state where the sun visor illustrated in FIG. 17 is raised.

Further, when attaching or detaching the working machine to or from the connector 8, the sun visor 110 may be moved backward about the rotary shaft 111. FIG. 20 is a diagram illustrating a state where the sun visor illustrated in FIG. 17 is raised. That is, the sun visor 110 is rotated backward about the rotary shaft 111, so that the sun visor 110 is raised backward to the extent that the sun visor extends while being slightly inclined downward from the horizontal state at the rear side of the rotary shaft 111.

When the water which is discharged from the drain hose outlets 85 of the rear drain hoses 82 by driving the air conditioner 70 in this state flows to the groove portions 112 of the sun visor 110, the water is distributed to both left and right sides while flowing backward along the groove portions 112 and is drained from the ends of the groove portions 112. Accordingly, the water which is discharged from the rear drain hose 82 is drained while being distributed to both left and right sides at a position away from the air conditioner installation portion 13 backward. For this reason, in a case where the operation is performed directly after the cabin 10 when attaching or detaching the working machine to or from the connector 8, the sun visor 110 is raised, so that the water hardly flows toward the operator.

When attaching or detaching the working machine to or from the connector 8 in this way, the angle of the sun visor 110 is adjusted in response to the operation state, so that the water which is discharged from the rear drain hose 82 hardly flows toward the operator.

Further, in the above-described air conditioning structure, the water which is discharged from the air conditioning unit 71 flows from the drain portion hose 86 to the drain hose 80 due to the gravity acting on the water. However, a unit which forcedly sends the water from the drain portion hose 86 to the drain hose 80 may be provided. FIG. 21 is a diagram illustrating a modified example of the tractor according to the embodiment and illustrating a case where a pump is provided. As the unit which sends the water from the drain portion hose 86 to the drain hose 80, for example, as illustrated in FIG. 21, a pump 120 which pressure-feeds the water inside the drain portion hose 86 to the drain hose 80 may be disposed at the connection portion between the drain hose 80 and the drain portion hose 86.

That is, instead of the T-shaped joint 88, the pump 120 may be disposed which includes three connection portions as in the T-shaped joint 88, is connected to the drain portion hose 86 and two drain hoses 80, and pressure-feeds the water inside the drain portion hose 86 to the front drain hose 81 and the rear drain hose 82. In this way, when the pump 120 is disposed at the connection portion between the drain portion hose 86 and the drain hose 80, the water which is discharged from the air conditioning unit 71 of the air conditioner 70 may be drained while flowing to the drain hose 80 regardless of the inclination state of the tractor 1. As a result, it is possible to improve the drainage performance.

Further, when the pump 120 is disposed in this way, the pump 120 may be disposed in the drain portion hose 86 instead of the connection portion with the front drain hose 81 and the rear drain hose 82. Even when the pump 120 is disposed in the drain portion hose 86, the water may be drained regardless of the inclination state of the tractor 1 by pressure-feeding the water discharged from the air conditioning unit 71 to the drain hose 80 using the pump 120.

Further, when the pump 120 is disposed in this way, it is desirable that the pump 120 be automatically driven in response to the water flowing state. For example, the drain portion hose 86 may be provided with a sensor (not illustrated) which detects whether the water flows through the drain portion hose 86 and the pump 120 may be driven when detecting that the water flows through the drain portion hose 86 by the sensor. Accordingly, when draining the water from the air conditioning unit 71, it is possible to improve the drainage performance by driving the pump 120. Furthermore, when the water is not drained from the air conditioning unit 71, it is possible to suppress the idle rotation of the pump 120 or the unnecessary driving thereof by stopping the pump 120. As a result, it is possible to improve the durability of the pump 120 while improving the drainage performance.

Further, in the above-described air conditioning structure, the front drain hose 81 enters the rear pillar frame 44 from the opening portion of the upper end of the rear pillar frame 44, but the front drain hose 81 may enter a portion other than the rear pillar frame 44. For example, when the center pillar frame 43 is formed in a pipe shape and the opening portion of the upper end thereof is exposed, the front drain hose 81 may enter the pipe-shaped center pillar frame 43. The front drain hose 81 passes through the inside of the pillar frame 41 from the inside of the air conditioner lower cover 62, so that the drain hose outlet 85 may be positioned at the lower side of the cabin 10. The pillar frame 41 through which the front drain hose 81 passes is not limited to the rear pillar frame 44.

Further, in the above-described air conditioning structure, the drain hose outlet 85 of the front drain hose 81 is opened into the step frame 58, and the water which is discharged from the drain hose outlet 85 is drained from the attachment member 32 of the step 31, but the water which is drained from the front drain hose 81 may be drained from a portion other than the step 31. For example, the front drain hose 81 may be directly opened to the road surface through the step frame 58 connected with the fender frame 55, so that the drainage from the drain hose outlet 85 of the front drain hose 81 may be directly performed with respect to the road surface. When the front drain hose 81 is provided so that the water discharged from the drain hose outlet 85 may be drained from the front lower side in relation to the air conditioning unit 71, the path of the drain portion may be different from the drain portion of the tractor according to the embodiment.

In the working vehicle according to the aspect of the invention, the water which is drained from the air conditioning unit may be drained from any drain hose outlet regardless of the inclination state of the working vehicle. Further, even when the amount of the water drained from the air conditioning unit is large, the water may be drained from a plurality of drain hose outlets. Accordingly, there is an effect that the drainage operation may be smoothly performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A working vehicle comprising:
a cabin;
an air conditioning unit disposed at a rear upper portion of the cabin;
a first drain portion located at a left side of the air conditioning unit, and a second drain portion located at a right side of the air conditioning unit;
a first T-shaped joint attached to the first drain portion, and a second T-shaped joint attached to the second drain portion;
first and second drain hoses connected to the first and second drain portions via the first and second T-shaped joints respectively such that water is drained from each drain portion by flowing through the drain hoses, wherein the drain hoses are disposed at left and right sides of the air conditioning unit, and each drain hose comprises a front drain hose and a rear drain hose, and both the front and rear drain hoses are provided with drain hose outlets from which the water flowing through the drain hoses is drained, wherein each of the front and rear drain hoses are respectively connected to front and rear sides of the corresponding T-shaped joint;
a cover which covers a lower side of the air conditioning unit; and
first and second vertical support posts provided for the cabin, each vertical support post disposed in an up and down direction, wherein each of the front drain hoses passes through an inside of a corresponding one of the first and second vertical support posts from an inside of the cover, and each of the drain hose outlets provided in the front drain hoses is positioned below the cabin,
wherein the rear drain hoses are disposed inside the cover, and each of the drain hose outlets provided in the rear drain hoses are exposed to an outside of the cover from a posterior end of the cover, and
wherein each T-shaped joint and its respective front and rear drain hoses in the cover are inclined downward from a rear direction toward a front direction.

2. The working vehicle according to claim 1, wherein a portion of each of the drain hoses disposed inside the cover is inclined downward toward a front side of the working vehicle.

3. The working vehicle according to claim 1, wherein the drain portions of the air conditioning unit are connected to the respective T-shaped joints through drainage members, and
wherein each of the front and rear drain hoses are connected to one of the drainage members to be branched into two directions in the front and rear direction of the working vehicle.

* * * * *